US007837194B2

(12) United States Patent
Terada

(10) Patent No.: US 7,837,194 B2
(45) Date of Patent: Nov. 23, 2010

(54) FEEDING APPARATUS AND IMAGE FORMING SYSTEM

(75) Inventor: Kohei Terada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1187 days.

(21) Appl. No.: 11/277,658

(22) Filed: Mar. 28, 2006

(65) Prior Publication Data

US 2006/0221412 A1   Oct. 5, 2006

(30) Foreign Application Priority Data

Mar. 30, 2005 (JP) .............................. 2005-099255
Mar. 30, 2005 (JP) .............................. 2005-099262

(51) Int. Cl.
*B65H 5/12* (2006.01)
(52) U.S. Cl. ....................... 271/266; 271/114; 271/115; 271/270
(58) Field of Classification Search ................. 271/114, 271/115, 266, 270
See application file for complete search history.

(56) References Cited

U.S. PATENT DOCUMENTS

| 4,822,019 | A | * | 4/1989 | Nagira ...................... 271/9.02 |
| 5,149,080 | A | * | 9/1992 | Yamamoto ............. 271/265.01 |
| 6,164,641 | A | * | 12/2000 | Harada et al. ............... 271/198 |
| 6,599,043 | B2 | | 7/2003 | Kobayashi et al. |
| 6,702,492 | B2 | | 3/2004 | Saito |
| 6,747,429 | B2 | | 6/2004 | Igarashi |
| 6,838,855 | B2 | | 1/2005 | Kobayashi et al. |
| 6,986,615 | B2 | * | 1/2006 | Moore et al. ................ 400/625 |
| 7,415,239 | B2 | * | 8/2008 | Saito et al. .................. 399/388 |
| 7,615,958 | B2 | * | 11/2009 | Takeishi et al. ............. 318/599 |

(Continued)

FOREIGN PATENT DOCUMENTS

EP    376112 A2 *  7/1990

(Continued)

OTHER PUBLICATIONS

Japan Patent Office; Notification of Reason for Refusal in Japanese Patent Application No. 2006-095017 (counterpart to the above-captioned U.S. Patent Application) mailed Feb. 3, 2009.

*Primary Examiner*—Patrick Mackey
*Assistant Examiner*—Prasad V Gokhale
(74) *Attorney, Agent, or Firm*—Baker Botts L.L.P.

(57) ABSTRACT

A feeding apparatus including a feeding device including (a) a feeder which feeds, in each of a plurality of feeding operations, an object in a feeding direction in a state in which an external force is exerted to the object in a direction parallel to the feeding direction, and (b) a motor which operates the feeder and thereby feeds the object; and a controller which controls, in each feeding operation, the motor by supplying, in a first control mode, a first power to the motor so as to feed the object to a control-end position distant from a target stop position by a predetermined amount, and supplying, in a second control mode, a second power different from the first power, to the motor so that the feeder applies, to the object, a resisting force resisting the external force and thereby prevents at least a portion of a movement of the object in the direction parallel to the feeding direction that is caused by the external force.

23 Claims, 20 Drawing Sheets

U.S. PATENT DOCUMENTS

| | | | |
|---|---|---|---|
| 2003/0026640 A1* | 2/2003 | Moore et al. | 400/625 |
| 2003/0085513 A1* | 5/2003 | Takahara et al. | 271/270 |
| 2003/0201600 A1* | 10/2003 | Hayashi | 271/270 |
| 2006/0222433 A1* | 10/2006 | Terada et al. | 400/624 |

FOREIGN PATENT DOCUMENTS

| | | |
|---|---|---|
| EP | 2004079760 | 9/2004 |
| JP | 05162869 A * | 6/1993 |
| JP | 2002-096512 A | 4/2002 |
| JP | 2002128313 | 5/2002 |
| JP | 2002137469 | 5/2002 |
| JP | 2002345277 | 11/2002 |
| JP | 2004289139 | 10/2004 |

\* cited by examiner (RETURNING BY BACKWARD TENSION)

(ADVANCING BY FORWARD TENSION)

(RETURNING BY BACKWARD TENSION)

(ADVANCING BY FORWARD TENSION)

FEEDING APPARATUS AND IMAGE FORMING SYSTEM

The present application is based on Japanese Patent Application Nos. 2005-099255 and 2005-099262, each filed on Mar. 30, 2005, the contents of which are incorporated herein by reference.

BACKGROUND OF THE INVENTION

1. Field of the Invention

The present invention relates to a feeding apparatus including a feeder (e.g., a feeding roller) that is driven or operated (e.g., rotated) by a motor (e.g., an electric motor) so as to feed an object to a target stop position, and also relates to an image forming system employing the feeding apparatus so as to feed a recording medium.

2. Discussion of Related Art

There is known a serial-type inkjet printer that records an image on a recording sheet by repeating (a) an operation to control an electric motor so as to rotate a feeding roller to feed the sheet to an image-recording position and stop the sheet at that position, and (b) an operation to move, at the image-recording position, a recording head in a main scanning direction perpendicular to the direction of feeding of recording sheet, so that the recording head ejects, according to image data, droplets of ink toward the recording sheet so as to record the image on the sheet.

Thus, at the image-recording position, it is needed to feed and stop the recording sheet, each time the recording head performs one-time scanning movement. However, if an actual stop position where the recording sheet is actually stopped is deviated from a target stop position, a white or thick "stripe" occurs to an image recorded the sheet, which damages a clear recording of image.

Hence, generally, an inkjet printer is operated such that each time a recording head performs one scanning movement, the printer controls a feeding speed of a feeding roller, as indicated by a solid line in FIG. 10A, while monitoring, with an encoder, a current position of a recording sheet fed by the feeding roller.

More specifically described, in a conventional printer disclosed by, e.g., Japanese Patent Application Publication No. 2002-128313, an electric motor is first accelerated and then decelerated so that a feeding speed (i.e., a rotation speed) of a feeding roller is lowered, near a target stop position, to a sufficiently low speed and, when a recording sheet reaches a "motor-off" position before the target stop position by a predetermined distance, a, the supplying of electric current to the motor is stopped, so that the feeding roller is allowed to be rotated by its inertia and then stopped naturally. Thus, the driving of the feeding roller is controlled so that the roller may be stopped at the target stop position.

SUMMARY OF THE INVENTION

In the above-described controlling method, if the feeding speed of the feeding roller can be controlled to an aimed speed at the motor-off position, the recording sheet is fed by inertia by the aimed distance a from the motor-off position, so that the sheet may be accurately stopped at the target stop position. However, since the supplying of electric current to the electric motor is stopped at the motor-off position, the motor or the roller may be more or less rotated if an external force is exerted to the sheet.

More specifically described, generally, in a printer, a sheet supplying device including a sheet supplying roller supplies a recording sheet from a sheet accommodating portion to an image recording portion. Therefore, the recording sheet receives a resistance resulting from friction and deformation thereof, a resistance of the roller, etc., all as a returning force to return the sheet in a backward direction opposite to a sheet feeding direction. That is, the recording sheet is subjected to a "backward" force or tension. If the backward tension is great, the recording sheet is returned toward the sheet supplying device, as indicated by a broken line in FIG. 10A, after the motor-off position, so that the sheet may not be stopped at the target stop position.

The above-indicated problem can be solved if an amount of returning of the recording sheet, caused by the backward tension, is constant, that is, if the motor-off position is determined while the constant returning amount of recording sheet is taken into account. In this case, however, the recording sheet is returned after the sheet is fed to the motor-off position including the constant returning amount, as indicated by a broken line in FIG. 10B. Thus, the feeding of the recording sheet needs an additional time, and accordingly an image-recording time is increased.

Meanwhile, generally, a DC (direct current) motor is used as the electric motor to drive or rotate the feeding roller. However, a DC motor has such a characteristic that even if an electric current or voltage to drive the motor may be constant, a torque produced by the motor is not constant while a rotor of the motor is rotated by 360 degrees. More specifically described, a periodic torque change, i.e., a "cogging" periodic change occurs to the motor or the roller, as shown in FIG. 11A. Therefore, if the motor-off position coincides with the torque-change position, the returning amount of the recording sheet owing to the backward tension is changed, so that a stop-position error, i.e., a deviation of an actual stop position from the target stop position may occur, as shown in FIG. 10B.

In addition to the stop-position error, an unavailable position range where the feeding roller cannot be stopped may occur. More specifically explained, if a periodic torque change occurs to the feeding roller because of, e.g., cogging of the electric motor, the feeding speed (i.e., rotation speed) of the roller is periodically lowered, as shown in FIG. 11A. The periodic torque change takes a plurality of maximum-torque-change positions each having a local maximum torque change. If the motor-off position is determined at a position near one of the maximum-torque change positions but before the one maximum-torque-change position, in other words, if a phase of the periodic torque change that corresponds to the motor-off position is more or less short of a maximum-torque-change phase corresponding to the one maximum-torque-change position, i.e., falls in a phase range "A", shown in FIG. 11B, a returning amount of the feeding roller from the motor-off position is increased by the influence of the torque change; and if the phase of the periodic torque change that corresponds to the motor-off position is more or less excessive over the maximum-torque-change phase, i.e., falls in a phase range "B", the feeding roller is returned to, and stopped at, the maximum-torque-change phase.

That is, if, in a state in which an external torque is exerted to the object, in a backward direction opposite to the direction of feeding of the object, the supplying of electric current to the electric motor is stopped in a phase range near a maximum-torque-change phase, an unavailable position range where the motor or the roller cannot be stopped may occur, as indicated by a solid line in FIG. 12A, even if the motor-off position may be adjusted anyway. Thus, the object cannot be fed to the target stop position, if the stop position falls in the unavailable position range.

Meanwhile, a printer employs a sheet discharging roller that discharges a recording sheet after an image is recorded on the sheet. Since the sheet discharging roller is rotated at a speed higher than the rotation speed of the feeding roller, the recording sheet is pulled in the sheet feeding direction by the sheet discharging roller when the sheet is engaged with the discharging roller. Thus, the recording sheet may be subjected to a "forward" force or tension.

If, in a state in which the forward tension is exerted to the recording sheet or the feeding roller, the supplying of electric current to the electric motor is stopped, the feeding roller is rotated in the sheet feeding direction by the forward tension. However, if a phase of the periodic torque change that corresponds to the motor-off position is more or less short of a maximum-torque-change phase, i.e., falls in the phase range "A", shown in FIG. 11B, the feeding, roller is advanced to, and stopped at, the maximum-torque-change phase, by the influence of the torque change; and if the phase of the periodic torque change that corresponds to the motor-off position is more or less excessive over the maximum-torque-change phase, i.e., falls in the phase range "B", an advancing amount of the feeding roller from the motor-off position in the sheet feeding direction is increased.

That is, if, in a state in which an external torque is exerted to the object in a forward direction parallel to the sheet feeding direction, the supplying of electric current to the electric motor is stopped in a phase range near a maximum-torque-change phase, an unavailable position range where the motor or the roller cannot be stopped may occur, as indicated by a solid line in FIG. 12b, even if the motor-off position may be adjusted anyway. Thus, the object cannot be fed to the target stop position, if the stop position falls in the unavailable position range.

The above-indicated Japanese patent document proposes to prevent each motor-off position from being determined at each maximum-torque-change phase, i.e., employ a gear device that transmits a power from the electric motor to the feeding roller and has a gear ratio assuring that a minimum feeding-amount unit that can be controlled to rotate the roller and thereby feed the recording sheet is equal to the product of the period of the cogging-caused torque change of the motor and an integral number, so that after the supplying of electric current to the motor is stopped at the motor-off position, the roller may be stopped at a position distant by a constant distance from the motor-off position.

In the above-indicated method, however, a gear and a belt of a power transmission system provided between the electric motor and the feeding roller, and/or the feeding roller itself (e.g., its diameter) need to have highly accurate dimensions, for the purpose of assuring that the minimum feeding-amount unit of the feeding roller is equal to the product of the torque-change period and the integral number. Consequently the production cost of the printer is increased.

In the above-described technical background, the present invention has been developed. It is therefore an object of the present invention to solve at least one of the above-indicated problems. It is another object of the present invention to provide a feeding apparatus and a feeding method that can feed an object such as a recording sheet to a target stop position even if an external force such as a backward tension and/or a forward tension may be exerted to the object. It is another object of the present invention to provide an image forming system and an image forming method that employs the feeding apparatus or the feeding method.

According to a first aspect of the present invention, there is provided a feeding apparatus, comprising a feeding device including (a) a feeder which feeds, in each of a plurality of feeding operations, an object in a feeding direction in a state in which an external force is exerted to the object in a direction parallel to the feeding direction, and (b) a motor which operates the feeder and thereby feeds the object; and a controller which controls, in said each feeding operation, the motor by supplying, in a first control mode, a first power to the motor so as to feed the object to a control-end position distant from a target stop position by a predetermined amount, and supplying, in a second control mode, a second power different from the first power, to the motor so that the feeder applies, to the object, a resisting force resisting the external force and thereby prevents at least a portion of a movement of the object in said direction parallel to the feeding direction that is caused by the external force.

In the present feeding apparatus, the controller controls the motor by supplying, in the first control mode, the first power to the motor so as to feed the object to the control-end position distant from the target stop position by the predetermined amount, and additionally supplying, in the second control mode following the first control mode, the second power different from the first power, to the motor so that the feeder applies, to the object, the resisting force resisting the external force and thereby prevents at least a portion of the movement of the object in the direction parallel to the feeding direction that is caused by the external force. Therefore, the present feeding apparatus can more reliably feed the object to the target stop position even if the external force may be exerted to the object. The feeder may be a feeding roller or a feeding belt; the object may be a recording medium such as a recording sheet; the external force may be a backward or forward force such as a backward or forward tension that is exerted to the object in a backward or forward direction parallel to the feeding direction; the motor may be an electric motor such a rotary motor or a linear motor; the controller may be a computer; the first power may be a first electric power to operate the motor in a forward direction, i.e., feed the object in the feeding direction; the second power may be a second electric power to operate the motor in the forward direction or in a backward direction opposite to the forward direction; the resisting force may be a resisting torque resisting an external torque as the external force; and the movement of the object in the direction parallel to the feeding direction may be a movement of the object in the backward or forward direction parallel to the feeding direction.

According to a preferred feature of the first aspect of the present invention, the feeding apparatus further comprises an operation-amount detector which detects a current operation amount of the feeding device counted from a reference operation position thereof and thereby detects a current position of the object in the feeding direction; and a periodic-change-characteristic memory which stores (a) a period, B, of a periodic operation-speed change which occurs to an operation speed of the feeding device when the feeding device feeds the object and which has a maximum-deviation point having a maximum deviation from a reference operation speed, and (b) a phase of the maximum-deviation point. The controller includes at least one of (a) a first second-power supplying portion which supplies, when a phase of a control-end point of the periodic operation-speed change that corresponds to the control-end position distant from the target stop position by the predetermined amount and that is determined based on the period of the periodic operation-speed change stored by the periodic-change-characteristic memory and the current operation amount of the feeding device detected by the operation-amount detector, falls in at least a portion of a range of from the phase of the maximum-deviation point minus half said period, −B/2, to the phase of the maximum-deviation point, the second power to the motor, such that the feeder applies, to the object, the resisting force resisting the external force as a first external force which is exerted to the object in a first direction parallel to, and opposite to, the feeding direction, and (b) a second second-power supplying portion which supplies, when the phase of the control-end point falls in at least a portion of a range of from the phase of the maximum-deviation point to the phase of the maximum-deviation point plus half said period, +B/2, the second power to the motor, such that the feeder applies, to the object, the resisting force resisting the external force as a second external force which is exerted to the object in a second direction same as the feeding direction.

In the case where the controller includes the first second-power supplying portion, even if the periodic operation-speed (e.g., torque) change may occur to the feeding device including the motor and the external force may be exerted to the object in the first (i.e., backward) direction opposite to the feeding direction, an unavailable stop-position range (FIG. 12A) can be prevented from occurring to the feeding device including the feeder.

More specifically described, the controller may determine the phase of the control-end point of the periodic operation-speed change that corresponds to the control-end position where the supplying of the first power to the motor in the first control mode ends and, if the thus determined phase of the control-end point falls in at least a portion of the range of from the maximum-torque-change phase minus half the period, −B/2, to the maximum-torque-change phase (said portion of the range may include the maximum-torque-change phase), the first second-power supplying portion may supply the second power (e.g., an offset electric current, shown in FIG. 13A) to the motor, such that the smaller a difference of the phase of the control-end point and the phase of the maximum-deviation point is, the greater the second power is, so that the feeder applies, to the object, the resisting force resisting the first external force exerted to the object in the first direction opposite to the feeding direction. Consequently, as indicated by a solid line in FIG. 13A, the target stop positions of the object can be continuously changed by the controller by supplying, in the second control mode, the second power after the control-end position (i.e., a motor-off position) where the supplying of the first power to the motor in the first control mode ends. Thus, the present feeding apparatus is free of the problem of the conventional feeding apparatus that the unavailable stop-position range occurs to the feeding device.

In the case where the controller includes the first second-power supplying portion, even if the first external force may be exerted to the object in the first (i.e., backward) direction opposite to the feeding direction and the controller may stop the supplying of the first power to the motor at the control-end position corresponding to a phase in short of the phase of the maximum-deviation point where the periodic operation-speed change occurring to the feeding device takes the maximum deviation from the reference operation speed, the feeder (e.g., the feeding roller) can be stopped at the target stop position distant from the control-end position by the predetermined amount, so that the object can be fed to the target (i.e., desired) stop position.

The foregoing description is also true with the case where the controller includes the second second-power supplying portion. For example, even if the second external force may be exerted to the object in the second (i.e., forward) direction same as the feeding direction and the controller may stop the supplying of the first power to the motor at the control-end position corresponding to a phase in excess of the phase of the maximum-deviation point, the feeder can be stopped at the target stop position distant, so that the object can be fed to the target stop position.

According to another preferred feature of the first aspect of the present invention, the feeding apparatus further comprises an operation-amount detector which detects a current operation amount of the feeding device counted from a reference operation position thereof and thereby detects a current position of the object in the feeding direction. The controller includes a second-power supplying portion which supplies, in the second control mode after the first control mode ends in a current one of the feeding operations and before the first control mode starts in a following one of the feeding operations, the second power to the motor so that the feeder applies the resisting force resisting the external force and thereby stops and holds the object at a first actual stop position; and a second-power updating portion which obtains, when the second-power supplying portion is supplying the second power to the motor, the first actual stop position of the object detected by the rotation-amount detector, and updates, based on a difference of the obtained first actual stop position and the target stop position corresponding to the current feeding operation, the second power to an updated second power so that in the second control mode of the following feeding operation, the updated second power is supplied to the motor so that the feeder applies an updated resisting force resisting the external force and thereby stops and holds the object at a second actual stop position, such that a difference of the second actual stop position and the target stop position corresponding to the following feeding operation is smaller than the difference of the first actual stop position and the target stop position corresponding to the current feeding operation.

In the present feeding apparatus, the controller does not operate in the conventional manner that, after the controller has controlled the supplying of the first power to the motor so as to operate the feeder and thereby feed the object, the controller stops the supplying of the first power, but operates such that after the supplying of the first power, the second power is supplied to the motor so as to stop and hold the feeder. In addition, each time the controller ends the supplying of the second power to the motor, the controller obtains a difference of the actual stop position of the object from the target stop position, and updates the second power so as to reduce the difference, as shown in FIG. 20A. Therefore, even if the external force may be exerted to the object in the first (backward) direction opposite to the feeding direction or in the second (forward) direction same as the feeding direction, the object can be prevented from being returned or advanced by the external force, i.e., can be fed to the target, i.e., desired stop position. That is, the present feeding apparatus can quickly and accurately feed the object to the target stop position.

In the present feeding apparatus, the second power is supplied to the motor in the second mode, after the supplying of the first power to the motor in the first control mode ends. Therefore, even if, in the state in which the external torque is exerted to the object, the supplying of the first power to the motor may end around a phase where the periodic operation-speed change occurring to the feeding device takes the maximal deviation, the object can be stopped at the target stop position. That is, the present feeding apparatus can prevent the occurrence of the unavailable stop-position range, as shown in FIG. 12A or 12B, and can feed the object to the target stop position.

According to a second aspect of the present invention, there is provided an image forming system, comprising the feeding apparatus according to the first aspect of the present invention, wherein the feeding apparatus feeds a recording medium as the object, to an image-forming position as the target stop position; and an image forming device which forms an image on the recording medium fed to the image-forming position by the feeding apparatus.

The present image forming (or recording) system can accurately control the amount of feeding of each recording medium (e.g., a recording sheet) relative to the image-forming position. For example, even if a periodic operation-speed change may occur to the feeding device including the motor, the feeder, and a power transmission device provided between the motor and the feeder, the image forming device can form an image at any desired position on the recording medium. Thus, the present image forming system can record a clear image in an entire recording area on the recording medium. The controller of the feeding apparatus may be a personal computer (PC) that is connected via a cable to a printer including the feeding device and the image forming device, so that the PC may control the respective operations of the feeding device and the image forming device via the cable.

According to a third aspect of the present invention, there is provided a method of controlling a feeding device including (a) a feeder which feeds, in each of a plurality of feeding operations, an object in a feeding direction in a state in which an external force is exerted to the object in a direction parallel to the feeding direction, and (b) a motor which operates the feeder and thereby feeds the object, the method comprising supplying, in a first control mode in said each feeding operation, a first power to the motor so as to feed the object to a control-end position distant from a target stop position by a predetermined amount, and supplying, in a second control mode in said each feeding operation, a second power different from the first power, to the motor so that the feeder applies, to the object, a resisting force resisting the external force and thereby prevents at least a portion of a movement of the object in said direction parallel to the feeding direction that is caused by the external force.

According to a fourth aspect of the present invention, there is provided a method of forming an image on a recording medium, comprising feeding, by controlling a feeding device in the method according to the third aspect of the present invention, the recording medium as the object, to an image-forming position as the target stop position, and forming an image on the recording medium fed to the image-forming position.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
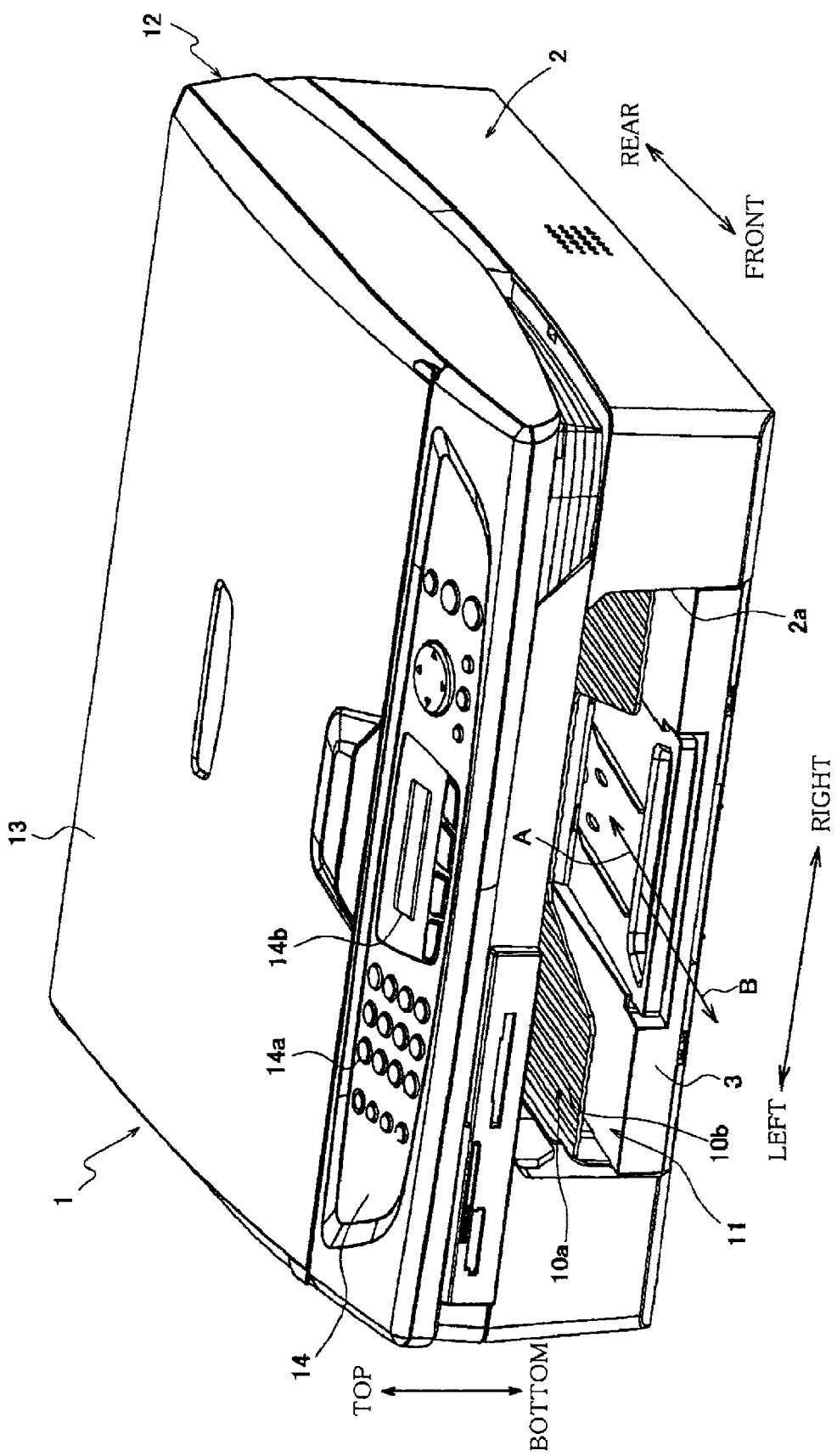
FIG. 1 is a perspective view of a multi-function device (MFD) as a first embodiment of the present invention.
Figure 2:
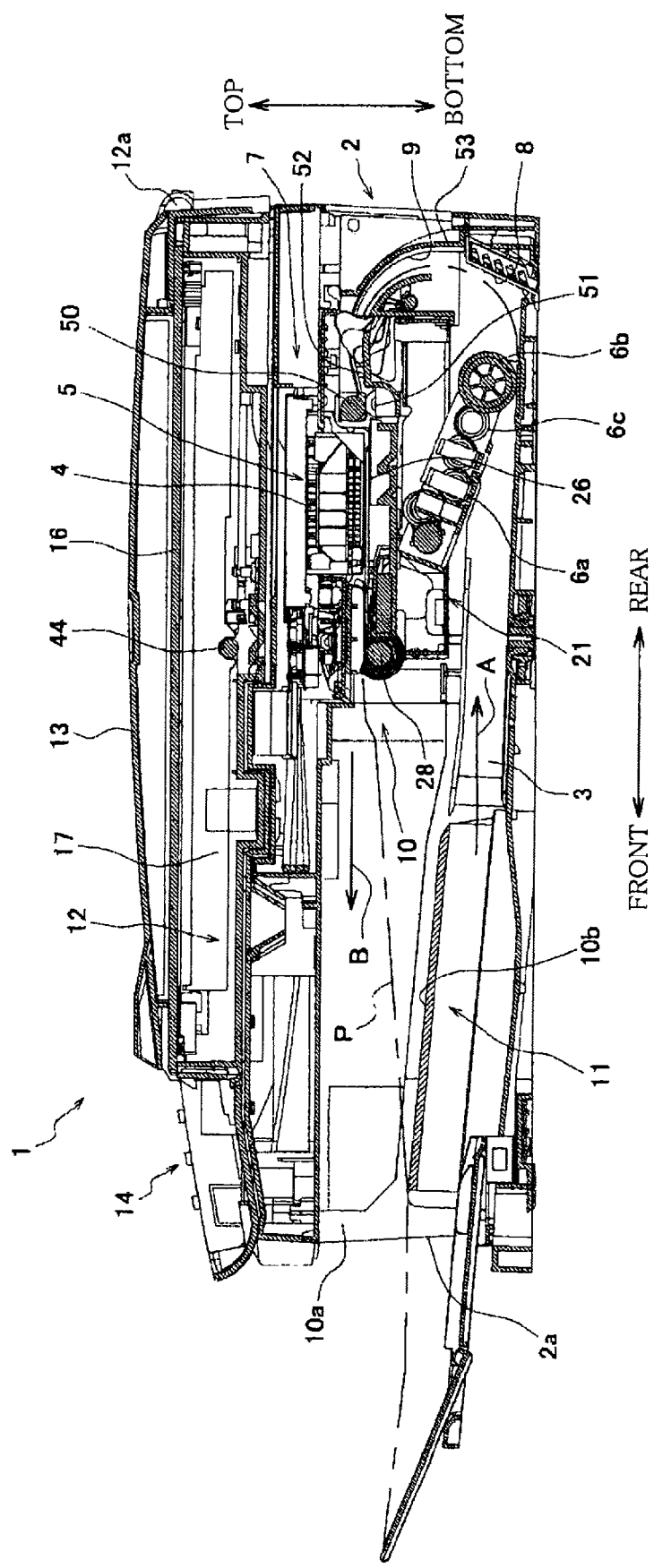
FIG. 2 is a cross-sectional view of the MFD.
Figure 3:
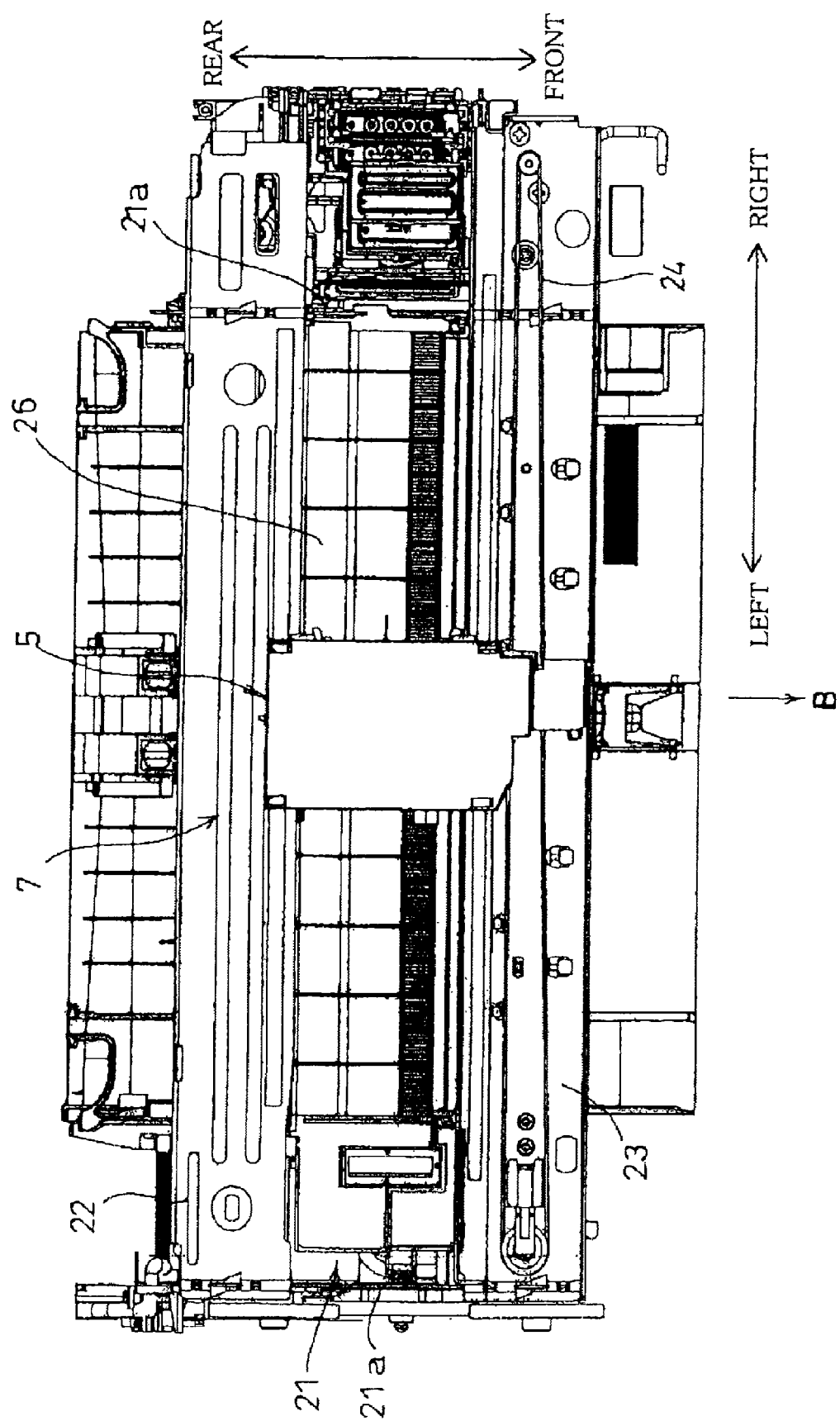
FIG. 3 is a plan view of a portion of the MFD in a state in which an image reading device thereof is removed.

Hereinafter, there will be described preferred embodiments of the present invention by reference to the drawings. FIGS. 1 through 3 show a so-called multi-function device (MFD) 1 to which the present invention is applied.

The MFD 1 has a printer function, a copier function, a scanner function, and a facsimile-machine function. As shown in FIGS. 1 and 2, the MFD 1 includes a housing 2 that is formed of a synthetic resin; and an image reading device 12 that is provided in a top portion of the housing 2 and is used to read an original image from an original sheet.

The image reading device 12 is constructed such that the reading device 12 is pivotable relative to the housing 2, about an axis portion, not shown, located along a left-hand end portion of the reading device 12, so that the reading device 12 can be opened upward and closed downward. A cover member 13 that can cover the original sheet placed on an upper surface of the image reading device 12, is attached to the reading device 12, such that the cover member 13 is pivotable relative to the reading device 12 about an axis portion 12a (FIG. 2) located along a rear end portion of the cover member 13, so that the cover member 13 can be opened upward and closed downward.

As shown in FIG. 2, the image reading device 12 includes a sheet-support glass plate 16 that supports, on the upper surface thereof, the original sheet and that is covered by the cover member 13 such that the cover member 13 can be opened upward to allow the original sheet to be placed on the glass plate 16. A contact image sensor (CIS) 17 is provided below the sheet-support glass plate 16, such that the image sensor 17 can be reciprocated along a guide shaft 44 extending in a main scanning direction (i.e., leftward and rightward directions in FIG. 1), so as to read the original image from the original sheet. The main scanning direction is perpendicular to the drawing sheet of FIG. 2.

As shown in FIGS. 1 and 2, an operation panel 14 is provided in front of the image reading device 12. The operation panel 14 includes various operation keys 14a that are operable by a user to input various commands; and a liquid-crystal (LCD) display 14b that displays various information.

In a bottom portion of the housing 2, there is provided a sheet supplying portion 11 that supplies a recording sheet, P, as a sort of recording medium (i.e., an object to be fed). The sheet supplying portion 11 includes a sheet cassette 3 that is insertable into, and removable from, a cassette-insertion opening 2a formed in a front-end portion of the housing 2, in a rearward and a frontward direction of the MFD 1, respectively. In the present embodiment, the sheet cassette 3 has a construction assuring that the cassette 3 can accommodate a plurality of recording sheets P, such as A4-size sheets, legal-size sheets, letter-size sheets, or postcard-size sheets, such that the recording sheets P are stacked on each other and respective short sides of the recording sheets P extend in a direction (i.e., the main scanning direction, or the leftward and rightward directions) perpendicular to a sheet supplying direction (i.e., a sub-scanning direction, the frontward and rearward directions, or a direction indicated by arrow A).

As shown in FIG. 2, the sheet cassette 3 has, in a rear end portion thereof, an inclined sheet-separate plate 8 that separates a leading end of each recording sheet P from the other recording sheets P. The sheet-separate plate 8 has a convexly curved shape in its plan view in which a middle portion of the plate 8 as seen in a widthwise direction of each recording sheet P (i.e., the leftward and rightward directions), swells frontward, and opposite end portions of the plate 8 do not swell. A serrate elastic sheet-separate body is attached to the middle portion of the sheet-separate plate 8. The sheet-separate body engages the leading end of each recording sheet P so as to promote the separation of the each sheet P from the other sheets P.

In the sheet supplying portion 11, an arm 6a that supplies each recording sheet P from the sheet cassette 3 is connected, at an upper end portion thereof, to the housing 2 such that the arm 6a is pivotable upward and downward. In addition, a sheet supplying roller 6b is supported by a lower end portion of the arm 6a, and is driven or rotated by an LF (line feed) motor 54 (FIG. 4) via a transmission device (i.e., a gear device) 6c provided in the arm 6a. The sheet supplying roller 6b cooperates with the above-described sheet-separate body of the sheet-separate plate 8 to separate and supply, one by one, the recording sheets P stacked on each other in the sheet cassette 3, so that each separated sheet P is supplied in the sheet supplying direction indicated by arrow A. Thus, the separated recording sheet P is supplied to an image recording or forming portion 7 via a sheet supplying path 9 that is defined by a first and a second path-defining member 53, 54. The recording portion 7 is provided at a position higher than the sheet cassette 3. In the present embodiment, the recording portion 7 constitutes an image recording or forming device.

FIG. 3 is a plan view of the MFD 1 in a state in which the image reading device 12 is removed for easier understanding. As shown in the figure, the recording portion 7 is provided between an upward opening, box-like main frame 21, and a first and a second elongate plate-like guide members 22, 23 that are respectively supported by two side walls of the main frame 21 and extend in the main scanning direction. The recording portion 7 includes an inkjet recording head 4 (FIG. 2) that ejects, from a lower surface thereof, droplets of ink so as to form or record an image on the recording sheet P; and a carriage 5 that carries the inkjet recording head 4 in the main scanning direction.

The carriage 5 bridges between the first guide member 22 located on an upstream side of the second guide member 23 as seen in a sheet discharging direction indicated by arrow B, and the second guide member 23, such that the carriage 5 is freely movable on the two guide members 22, 23 and accordingly is reciprocateable in the main scanning direction. A timing belt 24 is fixed to an upper surface of the second guide member 23, located on a downstream side of the first guide member 22 in the sheet discharging direction B, such that the timing belt 24 extends in the main scanning direction and is driven or circulated to reciprocate the carriage 5. A carriage (CR) motor, not shown, that drives or circulates the timing belt 24 is fixed to a lower surface of the second guide member 23.

In the recording portion 7, a flat platen 26 is fixed to the main frame 21, at a position between the two guide members 22, 23, such that the platen 26 extends in the main scanning direction, and is opposed to the lower surface of the recording head 4 that is moved by the carriage 5.

As shown in FIG. 2, a sheet feeding roller 50 as a feeder, and a nip roller 51 are provided on an upstream side of the platen 26 as seen in the sheet discharging direction B, and cooperate with each other to nip and feed the recording sheet P toward an image-forming position below the lower surface of the recording head 4. The nip roller 51 is opposed to the sheet feeding roller 50, and is biased toward the same 50. On a downstream side of the platen 26 in the sheet discharging direction B, there are provided a sheet discharging roller 28 that is driven or rotated to discharge the recording sheet P that has passed through the recording portion 7, to a sheet discharging portion 10 in the sheet, discharging direction B; and a spur roller, not shown, that is opposed to the discharging roller 28 and is biased toward the same 28.

The sheet discharging portion 10 discharges the recording sheet P having, on the upper surface thereof, the image recorded by the recording portion 7. The sheet discharging portion 10 is provided above the sheet supplying portion 11, and includes a sheet-discharge opening 10a that opens, together with the cassette-insertion opening 2a, in the front surface of the housing 2. The recording sheets P discharged from the sheet discharging portion 10 in the sheet discharging direction B are stacked on each other on a sheet-discharge tray 10b that is provided inside of the cassette-insertion opening 2a.

In a right-hand, front end portion of the housing 2, located below the image reading device 12, there is provided an ink storage portion, not shown, that accommodates four ink cartridges that store four color inks, respectively, i.e., black (Bk), cyan (C), magenta (M), and yellow inks (Y). In a state in which the image reading device 12 is opened upward, each of the four ink cartridges can be attached to, and detached from, the ink storage portion.

The four ink cartridges are connected to the above-described recording head 4 via respective flexible ink-supply tubes, not shown, so that the recording head 4 can record a full-color image on the recording sheet P.

The MFD 1 employs a control device including (a) a microcomputer that includes a central processing unit (CPU) 100 (FIG. 4), a read only memory (ROM), and a random access memory (RAM) and controls the MFD 1 as a whole; and (b) an application specific integrated circuit (ASIC) that drives or controls, according to commands supplied from the microcomputer (hereinafter, referred as the CPU 100), the above-described elements, e.g., the LF motor 54, the CR motor, the recording head 4, and the CIS 17.

The ASIC is connected to a panel interface that receives information inputted by the user through the operation keys 14a of the operation panel 14 and supplies the received information to the CPU 100 and that operates, according to display commands supplied from the CPU 100, the LCD display 14b of the operation panel 14 to display, e.g., various messages. The ASIC is also connected to a parallel interface or a USB interface that communicates with an external device, such as a personal computer (PC), via a parallel cable or a USB cable, and to a network control unit (NCU) that communicates with a terminal machine via a public switched telephone network (PSTN). The NCU is connected to a modem that demodulates communication signals supplied to the NCU via the PSTN and that modulates data, such as facsimile data, to be sent out from the NCU, into communication signals.

Thus, in the present embodiment, the MFD 1 can exhibit each of its printer function, its copier function, its scanner function, and its facsimile-machine function, under the cooperation of the CPU 100 and the ASIC connected to the same 100.

However, since the panel interface, the parallel interface, the UBS interface, the NCU, or the modem is not relevant to the present invention, those elements are not described or shown.

When the MFD 1 operates its printer function, its copier function, or its facsimile-machine function, so as to record an image on a recording sheet P, first, the CPU 100 cooperates with the ASIC to drive or rotate the LF motor 54 in a predetermined direction so as to rotate the sheet supplying roller 6b in the sheet supplying direction A, so that one recording sheet P is supplied from the sheet cassette 3 toward the sheet feeding roller 50. Subsequently, the LF motor 54 is rotated in an opposite direction by respective incremental amounts, so that the sheet feeding roller 50 and the sheet discharging roller 28 are rotated in the sheet discharging direction B by respective incremental amounts and accordingly the recording sheet P is stepwise moved to the platen 26. In addition, when the recording sheet P is temporarily stopped on the platen 26 during the above-described stepwise movement, the CPU 100 drives or rotates the CR motor to move the carriage 5 in the main scanning direction, so that the recording head 4 ejects, according to print data, droplets of the inks toward the recording sheet P.

Thus, an image corresponding to one-time scanning movement of the recording head 4 in the main scanning direction is recorded on the recording sheet P. The CPU 100 cooperates with the ASIC to repeat the above-described rotation of the LF motor 54 (i.e., the feeding of the recording sheet P), the rotation of the CR motor (i.e., the movement of the carriage 5), and the operation of the recording head 4, so as to record images on all portions of the recording sheet P.

As described above, while the recording sheet P is supplied from the sheet cassette 3 to the recording portion 7, the CPU 100 changes or switches the directions of rotation of the LF motor 54. The reason for this switching is as follows: In the present embodiment, the sheet supplying roller 6a, the sheet feeding roller 50, and the sheet discharging roller 28 are simultaneously rotated by the driving or rotating force of the LF motor 54. However, in the state in which the sheet supplying roller 6a is rotated in a forward direction to supply the recording sheet P from the sheet cassette 3, the sheet feeding roller 50 and the sheet discharging roller 28 are each rotated in a backward direction opposite to a forward direction to feed and discharge the recording sheet P (the forward direction will be referred to as the sheet-feeding rotation direction, where appropriate), so that the sheet feeding roller 50 and the nip roller 51 cooperate with each other to engage the leading end of the recording sheet P supplied from the sheet cassette 3 and thereby stop a further movement of the sheet P and correct an inclination of the sheet P, if any. Subsequently, when the direction of rotation of the LF motor 54 is switched to the opposite direction, the sheet feeding roller 50 and the sheet discharging roller 28 are rotated in the sheet-feed rotation direction, so that the recording sheet P is fed from the recording portion 7 to the sheet discharging portion 10.

In order that the recording sheet P may be fed in the above-described manner, the transmission device 6c that transmits the driving or rotating force of the LF motor 54 to the sheet supplying roller 6b is selectively placed in a transmission state in which the transmission device 6c transmits the rotating force, and a non-transmission state in which the transmission device 6c does not transmit the rotating force. Thus, the sheet supplying roller 6b receives the rotating force of the LF motor 54, only when the roller 6b carries out the sheet supplying operation.

Figure 4:
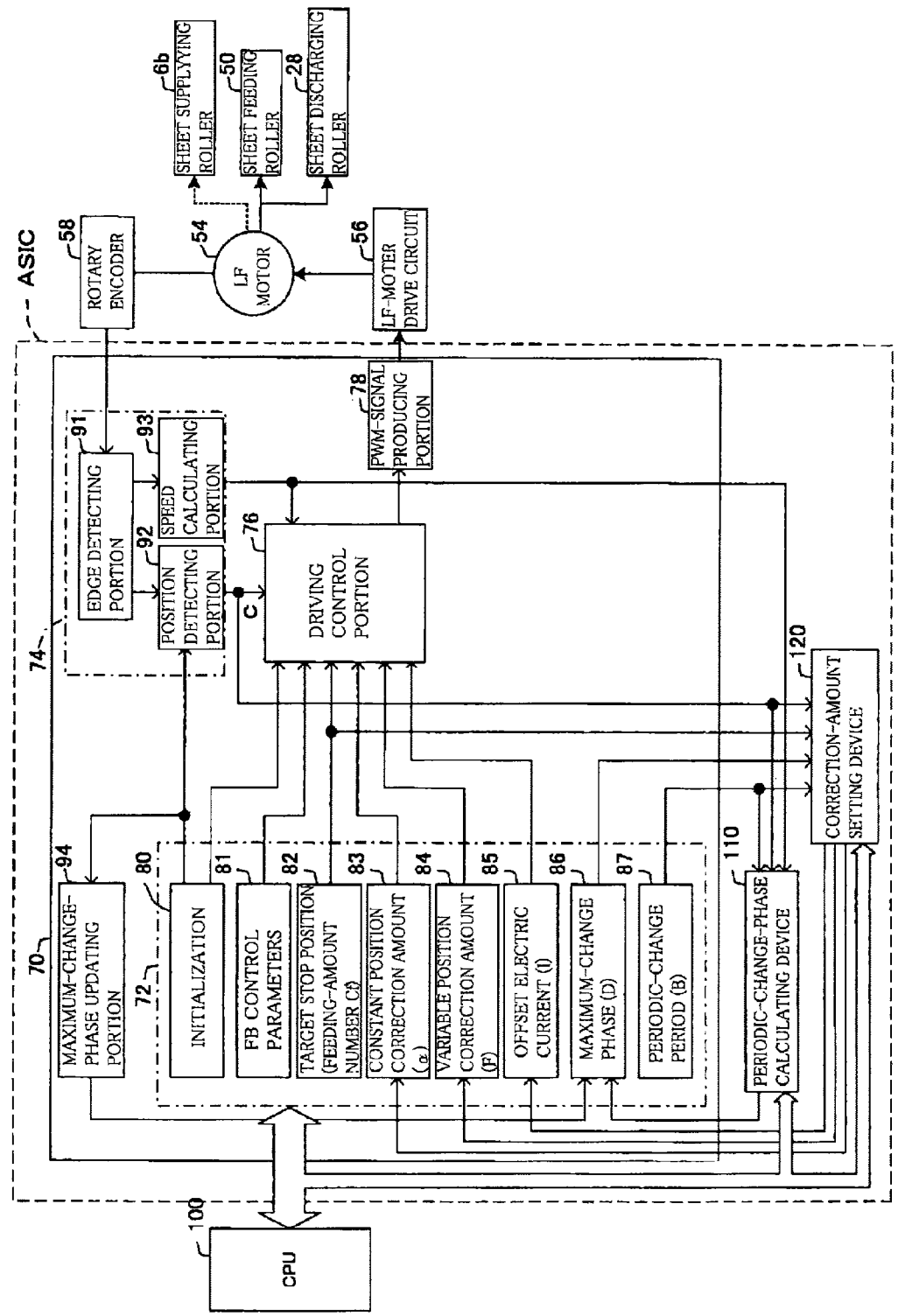
FIG. 4 is a block diagram showing a control system of the MFD that controls feeding of a recording sheet.

FIG. 4 is a block diagram showing an LF-motor control system that controls, according to a command supplied from the CPU 100, the LF motor 54 so as to rotate the sheet supplying roller 6b, the sheet feeding roller 50, and the sheet discharging roller 28, and thereby feed the recording sheet P in the above-described manner.

In the present embodiment, the LF motor 54 is constituted by a DC brush motor. As shown in FIG. 4, an output shaft of the LF motor 54 is provided with a rotary encoder 58 that detects an amount of rotation of the LF motor 54, that is, an amount of rotation of the sheet feeding roller 50. Thus, the rotary encoder 58 may be provided on a rotation axis of the sheet feeding roller 50.

The rotary encoder 58 includes a rotary plate that is fixed to the output shaft of the LF motor 54 and has a plurality of slits that are equiangularly spaced from each other about the output shaft; and a detecting portion that is constituted by a photointerrupter including a light emitter and a light receiver that are opposed to each other via the slits of the rotary plate. The detecting portion outputs two sorts of detection signals, i.e., first and second encoder signals ENC1, ENC2, that are offset from each other by a predetermined angular phase (e.g., one fourth of one period). Thus, a rotation direction of the LF motor 54 can be easily detected from the first and second encoder signals ENC1, ENC2 outputted by the detecting portion.

More specifically described, the first and second encoder signals ENC1, ENC2 are designed such that, for example, when the LF motor 54 rotates the sheet feeding roller 50 and the sheet discharging roller 28 in the sheet-feeding rotation direction, each first encoder signal ENC1 precedes the corresponding second encoder signal ENC2 by the predetermined angular phase; and when the LF motor 54 rotates the sheet feeding roller 50 and the sheet discharging roller 28 in the backward direction opposite to the sheet-feeding rotation direction, each first encoder signal ENC1 follows the corresponding second encoder signal ENC2 by the predetermined angular phase.

The first and second encoder signals ENC1, ENC2 outputted by the rotary encoder 58 are inputted to a sheet-feeding control device 70 as a portion of the ASIC. The sheet-feeding control device 70 controls the LF motor 54, according to the command supplied from the CPU 100. More specifically described, the control device 70 produces a PWM (pulse width modulation) signal to control a rotation speed, and a rotation direction, of the LF motor 54, and supplies the PWM signal to an LF-motor drive circuit 56. Thus, the control device 70 drives the LF motor 54 via the LF-motor drive circuit 56.

The sheet-feeding control device 70 includes a group of registers 72 that store various parameters used to control the LF motor 54; a motor-rotation measuring portion 74 that measures or calculates, based on the first and second encoder signals ENC1, ENC2 supplied from the rotary encoder 58, a rotation position (i.e., an angular phase) and a rotation speed of the LF motor 54 (or the sheet feeding roller 60) (the rotation position of the LF motor 54 corresponds to a position of the recording sheet P in a sheet feeding direction; a driving control portion 76 that produces a command signal to drive the LF motor 54; and a PWM-signal producing portion 78 that produces, in response to the command signal supplied from the driving control portion 76, the PWM signal to drive the LF motor 54 in a duty-cycle method. In the present embodiment, the driving control portion 76, the PWM-signal producing portion 78, and the LF-motor drive circuit 56 cooperate with each other to constitute a sheet-feeding control portion.

The motor-rotation measuring portion 74 includes an edge detecting portion 91, a position detecting portion 92, and a speed calculating portion 93. The edge detecting portion 91 detects, from the first and second encoder signals ENC1, ENC2 supplied from the rotary encoder 58, a signal edge indicating a start/end of each of the first encoder signals ENC1 (e.g., an edge of each first encoder signal ENC1 when the corresponding second encoder signal ENC2 takes a high level, and additionally detects a rotation direction of the LF motor 54 (e.g., the forward direction when the detected signal edge is a falling edge of each first encoder signal ENC1, and the backward direction when the detected signal edge is a rising edge of each signal ENC1). The edge detecting portion 91 produces an edge detection signal indicating the detection of the signal edge. The position detecting portion 92 counts up (i.e., increases) a total number of the edge detection signals produced by the edge detecting portion 91, when the rotation direction of the LF motor 54 detected by the edge detecting portion 91, i.e., the rotation direction of the sheet feeding roller 50 is the sheet-feeding rotation direction (i.e., when the recording sheet P is fed forward by the sheet feeding roller 50), and counts down (i.e., decreases) the total number of the edge detection signals produced by the edge detecting portion 91, when the rotation direction of the LF motor 54 or the sheet feeding roller 50 is the backward direction opposite to the sheet-feeding rotation direction (i.e., when the recording sheet P is supplied from the sheet cassette 3 by the sheet supplying roller 6b). Thus, the position detecting portion 92 constitutes a rotation-amount detecting portion that detects a rotation amount (i.e., a rotation position) of the LF motor 54 or the sheet feeding roller 50. The speed calculating portion 93 counts a number of pulses of an internal clock, CK, having an appropriate pulse width, with respect to a time interval between a time when one edge detection signal is supplied thereto from the edge detecting portion 91 and a time when the following edge detection signal is supplied thereto from the same 91, and calculates a rotation speed of the LF motor 54 or the sheet feeding roller 50 based on the counted pulse number and a known period of the internal clock CK.

The group of registers 72 include a register 80 that stores a start command to start an operation of the sheet-feeding control device 70; a register 81 that stores FB (feedback) control parameters including various control gains (e.g., a proportional gain and an integral gain) that are needed to perform a FB control with respect to the rotation speed of the LF motor 54; a register 82 that stores a target stop position of the LF motor 54 or the sheet feeding roller 50 (i.e., a feeding-amount number, Cf, representing a rotation amount of the LF motor 54 from a start of rotation of the same 54); a register 83 that stores a constant position-correction amount, α, representing a rotation amount of the LF motor 54 from a control-end position where a first control mode of the LF motor 54 ends to a position where the rotation of the LF motor 54 or the sheet feeding roller 50 actually stops; a register 84 that stores a variable position-correction amount, F, representing an error of an actual stop position of the sheet feeding roller 50 from the target stop position of the same 50, the error being caused by a periodic rotation-speed change of the LF motor 54 (e.g., a periodic torque change resulting from cogging of the LF motor 54); a register 85 that stores an offset current, I, to be supplied to the LF motor 54 in a second control mode following the first control mode, so as to prevent occurrence of an unavailable position range where the LF motor 54 cannot be stopped, the unavailable position range being caused by the periodic rotation-speed change occurring to the LF motor 54 and a backward or forward tension externally exerted to the recording sheet P; a register 86 that stores a maximum-change phase, D, representing an angular phase at which the periodic rotation-speed change occurring to the LF motor 54 takes a maximum deviation from a reference rotation speed; and a register 87 that stores a periodic-change period, B, representing a length of each of a plurality of cycles of the periodic rotation-speed change. Hereinafter, the periodic rotation-speed change occurring to the LF motor 54 will be simply referred to as the "periodic change", where appropriate.

Out of the various parameters stored by the group of registers 72, the start command, the FB control parameters, the target stop position (i.e., the feeding-amount number Cf), and the periodic-change period B stored by the registers 80, 81, 82, 87 are supplied thereto from the CPU 100; the constant position-correction amount α, the variable position-correction amount F, and the offset current I stored by the registers 83, 84, 85 are determined (or selected) and updated by a correction-amount setting device 120 as a different portion of the ASIC than the sheet-feeding control device 70, each time the LF motor 54 is driven or operated to perform a sheet feeding operation; and the maximum-change phase D stored by the register 86 is initially supplied thereto by a periodic-change-phase calculating device 110 as a different portion of the ASIC than the sheet-feeding control device 70, when the operation of the MFD 1 is started.

Meanwhile, the above-described position detecting portion 92 counts a number, C, indicating the current rotation position (i.e., angular phase) of the LF motor 54, and a counted number C=0 indicates a reference rotation position of the same 54. The maximum-change phase D stored by the register 86 indicates a number C counted by the position detecting portion 92 when the LF motor 54 is rotated in the sheet-feeding rotation direction from the reference rotation position to a rotation position where the periodic change takes a maximum deviation from a reference rotation speed. Therefore, if, when the operation of the MFD 1 is started, the number C counted by the position detecting portion 92 is reset to C=0, then the driving control portion 76 cannot recognize a current phase of the periodic change based on the counted number C. To solve this problem, the sheet-feeding control device 70 employs a maximum-change-phase updating portion 94 that updates, if the counted number C is reset to C=0, for example, when the feeding of the recording sheet P is started, the current maximum-change phase D stored by the register 86, based on the counted number C when it is reset to C=0.

In the present embodiment, the register 86 storing the maximum-change phase D, the register 87 storing the period-change period B set by the CPU 100, and the CPU 100 (or the ROM thereof) storing the period-change period B to be set to the register 87 cooperate with each other to constitute a periodic-change-characteristic memory; and the periodic-change-phase calculating device 110 constitutes a periodic-change-phase calculating portion.

Hereinafter, there will be described an operation of each of the periodic-change-phase calculating device 110, the driving control portion 76, the correction-amount setting device 120, and the maximum-change-phase updating portion 94 that cooperate with each other to constitute a relevant portion of the control system of the LF motor 54 or the sheet feeding roller 50. Those elements 110, 76, 120, 94 are provided as respective portions of the ASIC. However, those elements 110, 76, 120, 94 may be provided in the form of software, i.e., control programs that are implemented by the CPU 100 (i.e., the microcomputer including the CPU 100). Therefore, here, the respective operations of those elements 110, 76, 120, 94 are described by reference to flow charts, shown in FIGS. 5, 7, 8, and 9, that represent those control programs, respectively.

Figure 5:
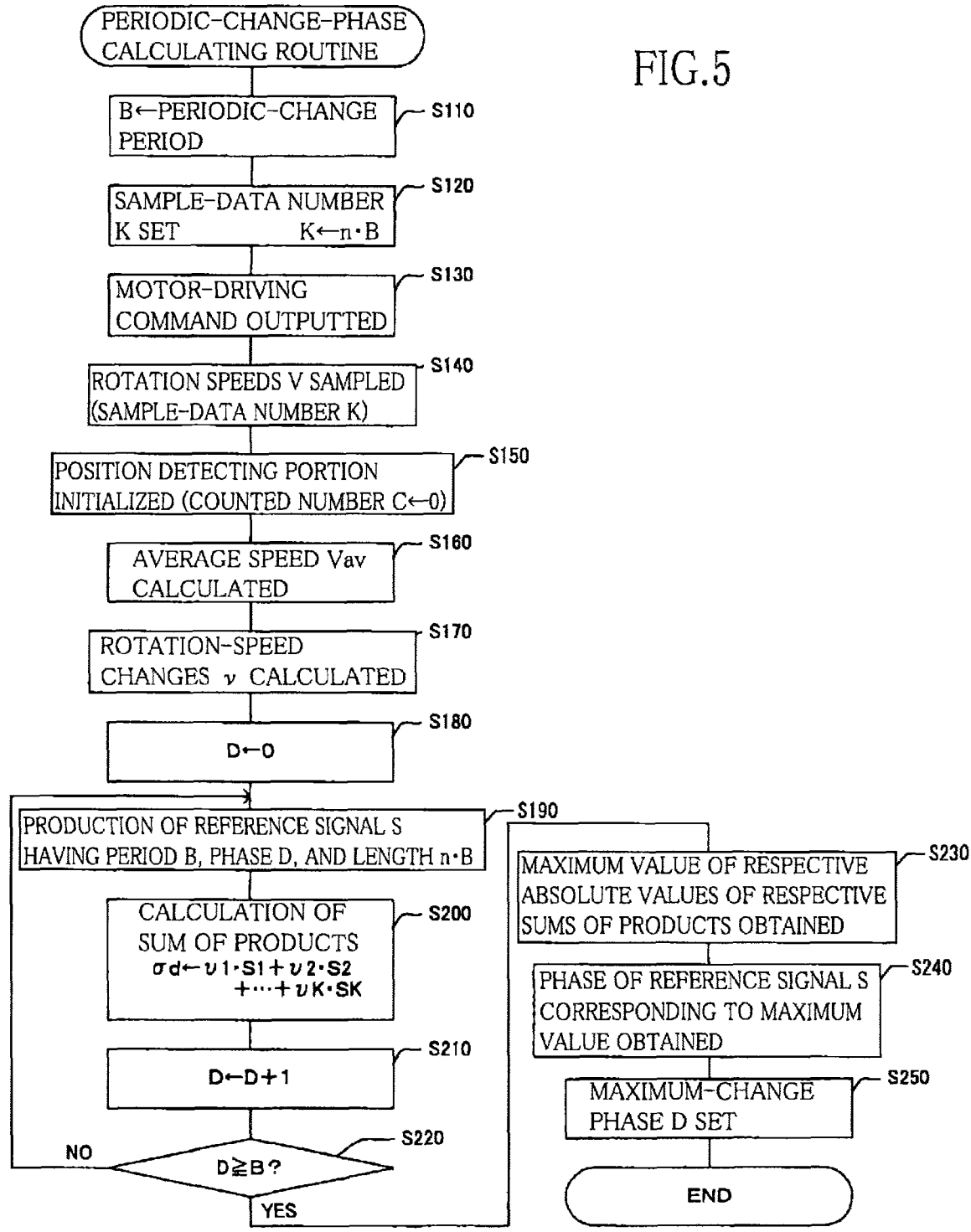
FIG. 5 is a flow chart representing a periodic-change-phase calculating routine that is implemented by the control system of FIG. 4.

FIG. 5 shows a flow chart representing a periodic-change-phase calculating program that is implemented by the periodic-change-phase calculating device 110. The periodic-change-phase calculating device 110 is operated to implement the periodic-change-phase calculating program, only one time when an electric power is applied to the MFD 1. First, at Step S110, the calculating device 110 reads the periodic-change period B that has been set in the register 87 by the CPU 100. The periodic-change period B is expressed in terms of a number of the edge detection signals produced by the edge detecting portion 91.

Subsequently, at Step S120, the calculating device 110 multiplies the periodic-change period B by a pre-set coefficient, n, so as to obtain a number, K, of sets of sample data to be obtained to detect the periodic rotation-speed change occurring to the LF motor 54. Then, at Step S130, the calculating device 110 supplies, to the CPU 100, a drive command to drive the LF motor 54, so as to rotate the LF motor 54 at a constant speed in the forward direction to rotate the sheet feeding roller 50 in the sheet-feed rotation direction. Then, at Step S140, the calculating device 110 obtains K sets of sample data that indicate respective rotation speed values, V, calculated by the speed calculating portion 93 in synchronism with the rotation of the LF motor 54.

Figure 6:
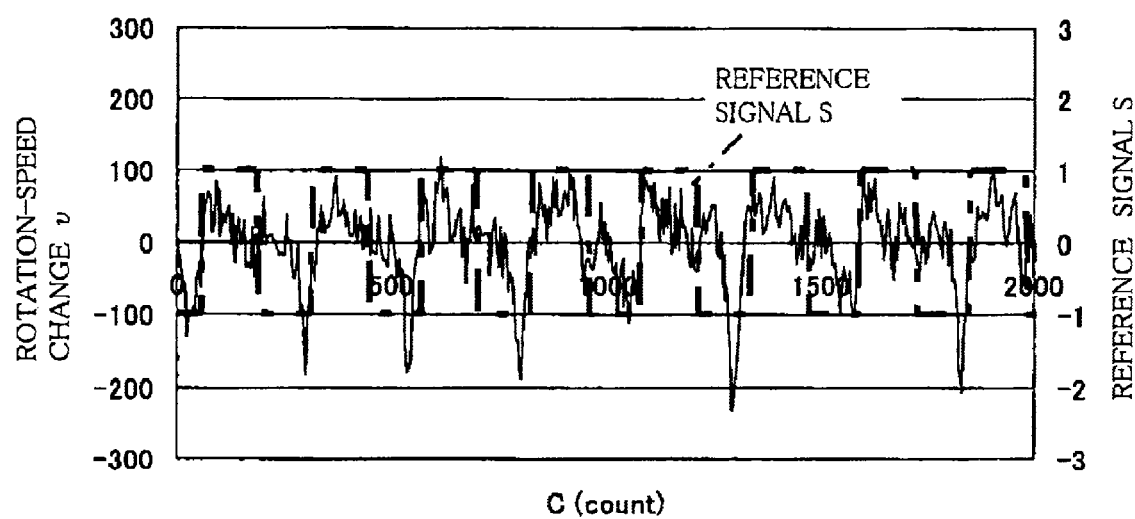
FIG. 6 is a graph showing a rotation-speed change, v, and a reference signal, S, that are used in the periodic-change-phase calculating routine.

At Step S150, the calculating device 110 orders the CPU 100 to reset the number C counted by the position detecting portion 92, and thereby initialize the counted number C to zero, C=0. Subsequently, at Step S160, the calculating device 110 calculates an average speed, $V_{av}$, of all the K rotation speed values V sampled in the sampling period at Step S140. Then, at Step S170, the calculating device 110 calculates, as a rotation-speed change, v (FIG. 6), a deviation of each of the K rotation speed values V from the average speed $V_{av}$ as the reference rotation speed.

Then, at Step S180, the calculating device 110 sets, as a phase, D, of a reference signal, S, an initial value, D=0. Subsequently, at Step S190, the calculating device 110 produces, as the reference signal S, a rectangular wave (FIG. 6) that has the same period as the periodic-change period B, has the same data resolution as that of the rotation-speed changes v, has the phase D at the current stop position of the LF motor 54, and has a length equal to the product of the pre-set number n and the period B. More specifically described, the rectangular wave is a series of data that periodically change while alternately taking a high level equal to 1 and a low level equal to −1, and is used as the reference signal S to detect the phases of the periodic change. Then, at Step S200, the calculating device 110 calculates a sum of products (σd←v1·S1+v2·S2+ . . . +vK·SK) of the rectangular wave (i.e., the reference signal S) produced at Step S190 and the rotation-speed changes v obtained at Step S170.

Next, at Step S210, the calculating device 110 increments the phase D by a unit angle. Subsequently, at Step S220, the calculating device 110 judges whether the phase D has been incremented by a number of the sample data corresponding to one period of the periodic change, i.e., the periodic-change period B. That is, the calculating device 110 judges whether the production of the reference signal S at Step S190 and the calculation of the sum of products at Step S200 have been repeated with respect to one period of the periodic change.

If a negative judgment is made at Step S220, the control goes back to Step S190 to shift the phase D of the reference signal S by one unit angle, and then goes to Step S200 to obtain a sum of products of the shifted reference signal S and the rotation-speed changes v.

On the other hand, if a positive judgment is made at Step S220, the control of the calculating device 110 goes to Step S230 to select one of respective absolute values of all the sums of products, obtained at Step S200, such that the selected one absolute value is the greatest one of the respective absolute values. Subsequently, at Step S240, the calculating device 110 obtains a temporary maximum-change phase D of the reference signal S that corresponds to the selected one absolute value. Then, at Step S250, the calculating device 110 determines a proper maximum-change phase D based on the temporary maximum-change phase D obtained at Step S240 according to a predetermined relationship between temporary maximum-change phase D and proper maximum-change phase D, and writes the thus determined proper maximum-change phase D in the register 86. The predetermined relationship may be experimentally determined in advance.

In short, the periodic-change-phase calculating device 110 detects the changes v of the rotation speed of the LF motor 54 (it is preferred to detect the rotation-speed changes v with respect to a time or an angle corresponding to not less than twice the period B of the periodic change), and repeats the calculation of the sum of products of the reference signal S and the rotation-speed changes v, while shifting the phase D of the reference signal S by a unit angle equal to the resolution of the sample data detected by the edge detecting portion 91, with respect to an angle equal to one period B of the periodic change. Then, the calculating device 110 obtains the phase D of the reference signal S that corresponds to the maximum value of the respective absolute values of the respective sums of products, and determines, as the proper maximum-change phase D, the number C that is counted by the position detecting portion 92 when the LF motor 54 is rotated in the sheet-feed rotation direction from the reference rotation position, i.e., the current stop position of the LF motor 54 to the maximum-change phase D.

In this method, the phase D of the maximum change of the periodic rotation-speed change of the LF motor 54 can be easily detected in association with the number C counted by the position detecting portion 92, without needing to perform complicated calculations by, e.g., using FFT (fast Fourier transform).

Figure 7:
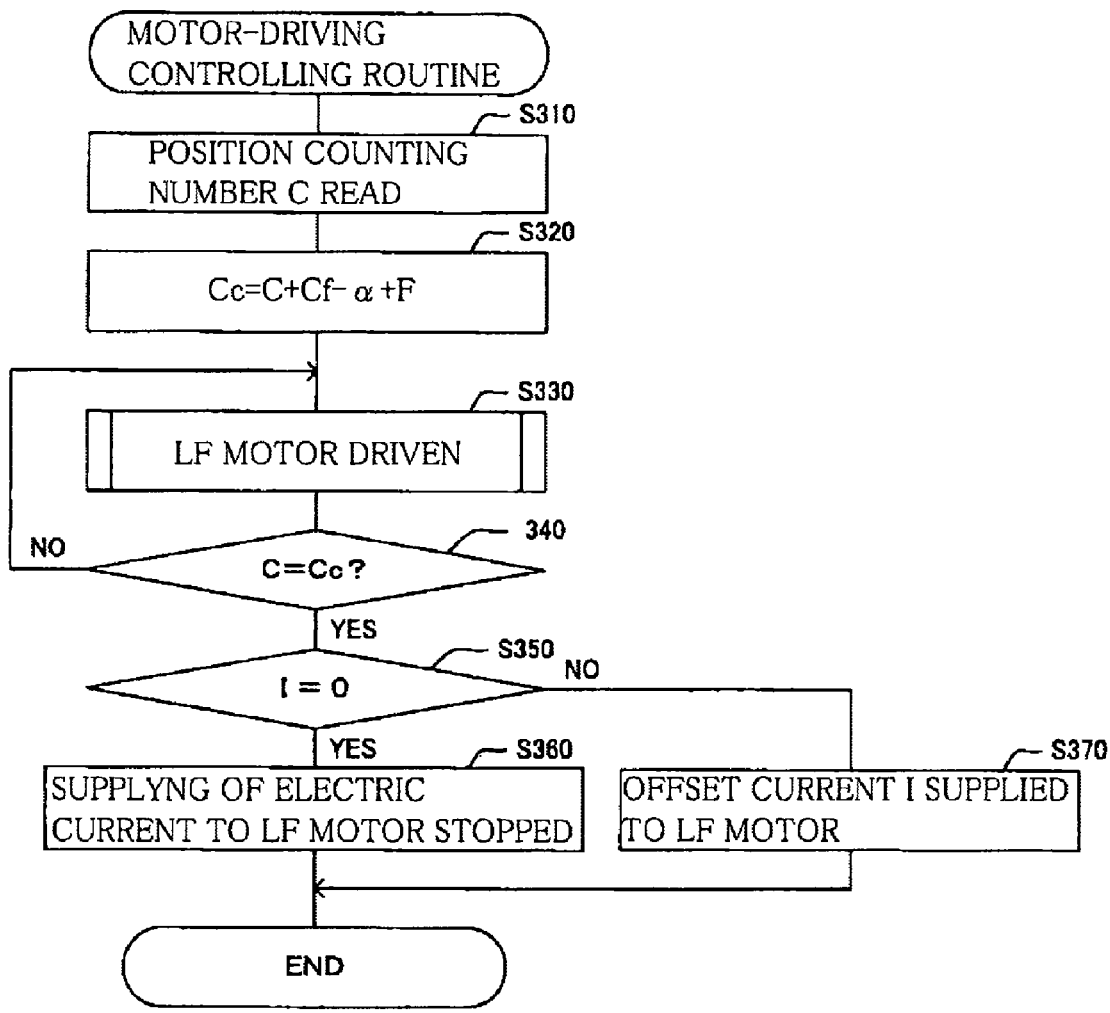
FIG. 7 is a flow chart representing a motor-driving controlling routine that is implemented by the control system of FIG. 4.

Next, FIG. 7 shows a flow chart representing a motor-driving controlling program that is implemented by the driving control portion 76 when the recording portion 7 records an image on a recording sheet P. In FIG. 7, first, at Step S310, the driving control portion 76 reads the current number C counted by the position detecting portion 92. Then, at Step S320, the control portion 76 adds or subtracts, to or from the current counted number C, the target stop position (i.e., the feeding-amount number Cf), the constant position-correction amount α, and the variable position-correction amount F stored by the registers 82, 83, 84, so as to calculate a control-end-position number, Cc (=C+Cf−α+F) indicating a control-end position where a first control mode of the current driving control of the LF motor 54 or the sheet feeding roller 50 is to end.

Subsequently, at Step S330, the driving control portion 76 drives the LF motor 54 in the forward direction to rotate the sheet feeding roller 50 in the sheet-feed rotation direction, and decreases the rotation speed of the LF motor 54 down to an extremely low speed near stopping, before the number C counted by the position detecting portion 92 reaches the control-end-position number Cc obtained at Step S320.

During the first control mode of the current driving control of the LF motor 54, the driving control portion 76 monitors, at Step S340, the number C counted by the position detecting portion 92, and judges whether the counted number C has reached the control-end-position number Cc. Thus, the control portion 92 waits for the counted number C to reach the control-end-position number Cc.

If a positive judgment is made at Step S340, then the control of the driving control portion 76 goes to Step S350 to read the offset current I from the register 85 and judge whether the offset current I is equal to 0, i.e., whether the supplying of electric current to the LF motor 54 is to be stopped in a second control mode following the first control mode. If a positive judgment is made at Step S350, the control goes to Step S360 to stop the supplying of electric current, to the LF motor 54, and quits the present routine. On the other hand, if a negative judgment is made at Step S350, then the control goes to Step S370 to produce a command signal to command the PWM-signal producing portion 78 to supply the offset current I to the LF motor 54 in the second control mode, and quits the present routine.

Figure 8:
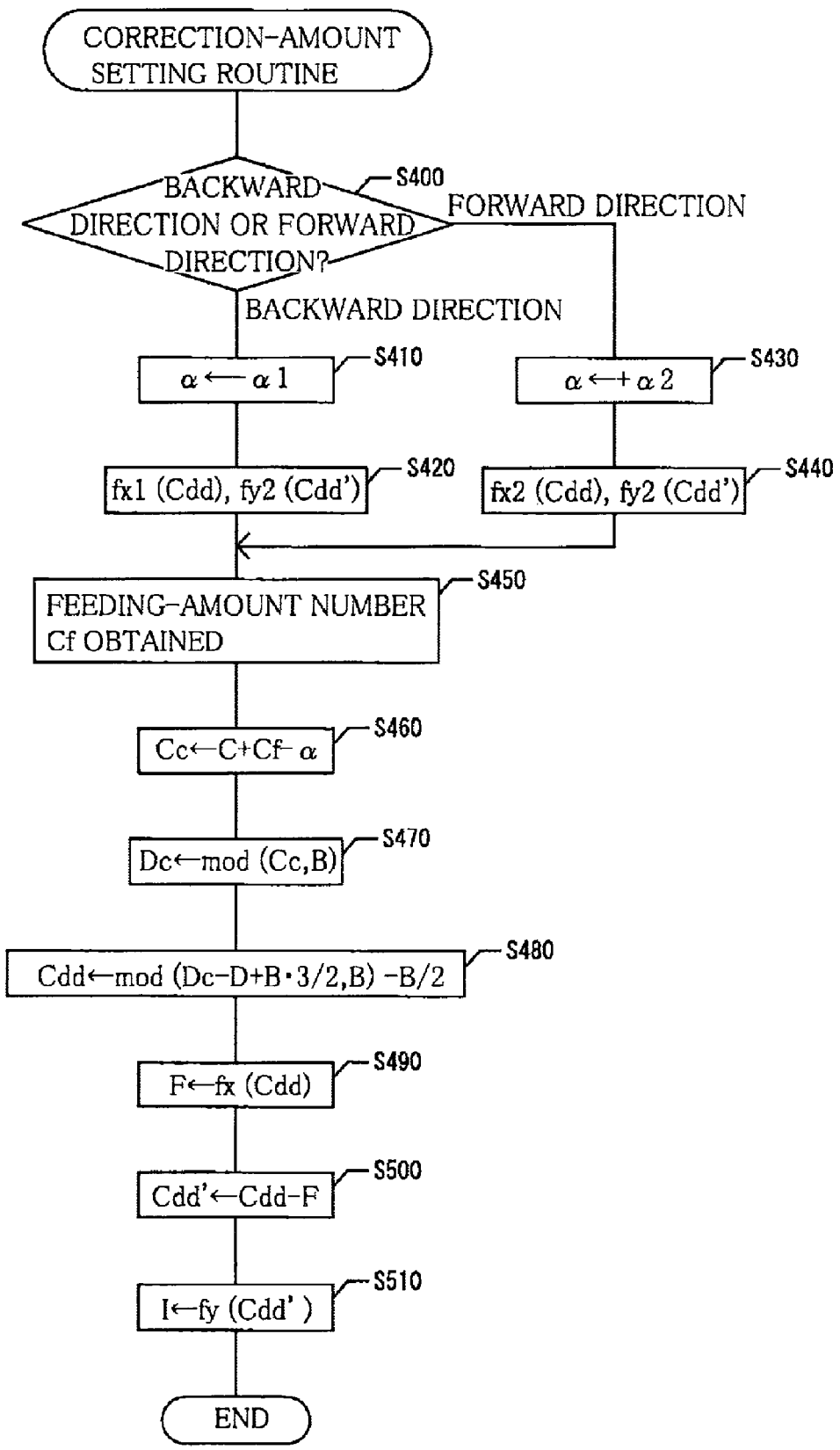
FIG. 8 is a flow chart representing a correction-amount setting routine that is implemented by the control system of FIG. 4.

Next, FIG. 8 shows a flow chart representing a correction-amount setting routine that is implemented by the correction-amount setting device 120. The correction-amount setting device 120 implements, according to a command supplied from the CPU 100, the correction-amount setting routine before the driving control portion 76 starts the motor driving controlling routine shown in FIG. 7, so that the setting device 120 sets the constant position-correction amount α, the variable position-correction amount F; and the offset current I in the three registers 83, 84, 85, respectively.

In the correction-amount setting routine shown in FIG. 8, first, at Step S400, the setting device 120 judges, based on the current number C counted by the position detecting portion 92 (i.e., the total amount of feeding of the recording sheet P after the current image recording operation has started), whether the recording sheet P is subject to a backward tension or a forward (i.e., sheet-feeding-direction) tension.

However, Step S400 may be modified such that, for example, in the case where a sheet-end sensor, not shown, that detects an end of each recording sheet P is provided in the sheet-supply passage between the sheet supplying roller 6b and the sheet feeding roller 50, the setting device 120 can judge whether the recording sheet P is subject to the backward or forward tension, by judging whether a trailing end of each recording sheet P has been detected by the sheet-end sensor.

If at Step S400 the setting device 120 judges that the recording sheet P is subject to the backward tension to draw the sheet P in the backward direction, the control of the setting device 120 goes to Step S410 to set, as the constant position-correction amount α, "−α1" that corrects an amount, α1, (FIG. 13A) of backward movement of the recording sheet P that occurs when the supplying of electric current to the LF motor 54 ends in the first control mode, and write the correction amount "−α1" in the register 83. Step S410 is followed by Step S420 to set, as a variable-position-correction-amount calculating function, $f_x(Cdd)$, for calculating the variable position-correction amount F, and an offset-electric-current calculating function, $f_y(Cdd')$, for calculating the offset electric current I, a function, $f_{x1}(Cdd)$, shown in FIG. 13A, and a function, $f_{y1}(Cdd')$, shown in FIG. 13B, respectively.

The function $f_{y1}(Cdd')$ is for calculating the offset electric current I that causes, when the sheet feeding roller 50 is subject to a backward force corresponding to the backward tension, the LF motor 54 to apply a resisting torque or force to the recording sheet P in the sheet feeding direction so as to prevent the above-described unavailable position range from occurring to the LF motor 54 (or the sheet feeding roller 50) because of the periodic change thereof, and the function $f_{x1}(Cdd)$ is for calculating the variable position-correction amount F that prevents the actual stopping position of the sheet feeding roller 50 from being deviated from the target stopping position because of the periodic change of the LF motor 54.

On the other hand, if at Step S400 the setting device 120 judges that the recording sheet P is subject to the forward tension, i.e., a forward force to move the recording sheet P in the sheet feeding direction, the control of the setting device 120 goes to Step S430 to set, as the constant position-correction amount α, "+α2" that corrects an amount, α2, (FIG. 14A) of forward movement of the recording sheet P that occurs when the supplying of electric current to the LF motor 54 ends in the first control mode, and write the correction amount "+α2" in the register 83. Step S430 is followed by Step S440 to set, as the variable position-correction amount calculating function $f_x(Cdd)$ and the offset electric current calculating function $f_y(Cdd')$, a function, $f_{x2}(Cdd)$, shown in FIG. 14A, and a function, $f_{y2}(Cdd')$, shown in FIG. 14B, respectively.

The function $f_{y2}(Cdd')$ is for calculating the offset electric current I that causes, when the sheet feeding roller 50 is subject to the forward force corresponding to the forward tension, the LF motor 54 to apply a resisting torque or force to the recording sheet P in the backward direction opposite to the sheet feeding direction so as to prevent the above-described unavailable position range from occurring to the LF motor 54 (or the sheet feeding roller 50) because of the periodic change thereof; and the function $f_{x2}(Cdd)$ is for calculating the variable position-correction amount F that prevents the actual stopping position of the sheet-feed roller 50 from being deviated from the target stop position because of the periodic change of the LF motor 54.

Subsequently, at Step S450, the setting device 120 reads, from the register 82, the feeding-amount number Cf indicating the target stop position of the LF motor 54 (or the sheet feeding roller 50 or the recording sheet P); and then, at Step S460, the setting device 120 calculates, based on the current number C counted by the position detecting portion 92, the feeding-amount number Cf, and the constant position-correction amount a set at Step S410 or S430, a control-end-position number, Cc (=C+Cf−α), where the first control mode is to end.

Then, at Step S470, the setting device 120 calculates a phase, Dc, of the periodic rotation-speed change that corresponds to the control-end position (i.e., the control-end-position number Cc), according to the following expression (1) having, as parameters, the control-end-position number Cc and the periodic-change period B:

$$Dc=\mod(Cc,B) \quad (1)$$

where "mod" indicates a remainder obtained when the former number in parentheses (i.e., Cc) is divided by the latter number (i.e., B).

Subsequently, at Step S480, the setting device 120 calculates a phase difference, Cdd, of the control-end-position phase Dc, obtained at Step S470, and the maximum-change phase D, according to the following expression (2) having, as parameters, the control-end-position phase Dc and the periodic-change period B:

$$Cdd=\mod(Dc-D+B\cdot 3/2,B)-B/2 \quad (2)$$

Thus, the phase difference Cdd is obtained as a value that falls in a range of 0±B/2 where the phase difference "Cdd=0" corresponds to the maximum-change phase D as a reference phase.

Then, at Step S490, the setting device 120 reads the variable position-correction amount calculating function $f_x(Cdd)$ set at Step S420 or Step S440, substitutes the parameter Cdd of the function $f_x(Cdd)$ with the phase difference Cdd obtained at Step S480, so as to calculate a variable position-correction amount F, and writes the thus calculated correction amount F in the register 84.

Subsequently, at Step S500, the setting device 120 corrects the phase difference Cdd obtained at Step S480, by using the variable position-correction amount F obtained at Step S490, so as to obtain a corrected phase difference, Cdd', according to the following expression: Cdd'=Cdd−F. Then, at Step S510, the setting device 120 substitutes the parameter Cdd' of the function $f_y(Cdd')$ set at Step S420 or S440, with the corrected phase difference Cdd' obtained at Step S500, so as to calculate an offset electric current I that is needed to stop the sheet feeding roller 50 at the target stop position, and writes the offset amount I in the register 85. Then, the setting device 120 quits the present routine.

In the present embodiment, a portion of the correction-amount setting device 120 that carries out Steps S420 and S510 constitutes a first second-power supplying portion; a portion of the correction-amount setting device 120 that carries out Steps S440 and S510 constitutes a second second-power supplying portion; a portion of the correction-amount setting device 120 that carries out Step S480 constitutes a phase comparing portion; and a portion of the correction-amount setting device 120 that carries out Step S490 constitutes a variable-position-correction-amount calculating portion; and a portion of the correction-amount setting device 120 that carries out Step S320 constitutes a control-end-position correcting portion.

Figure 9:
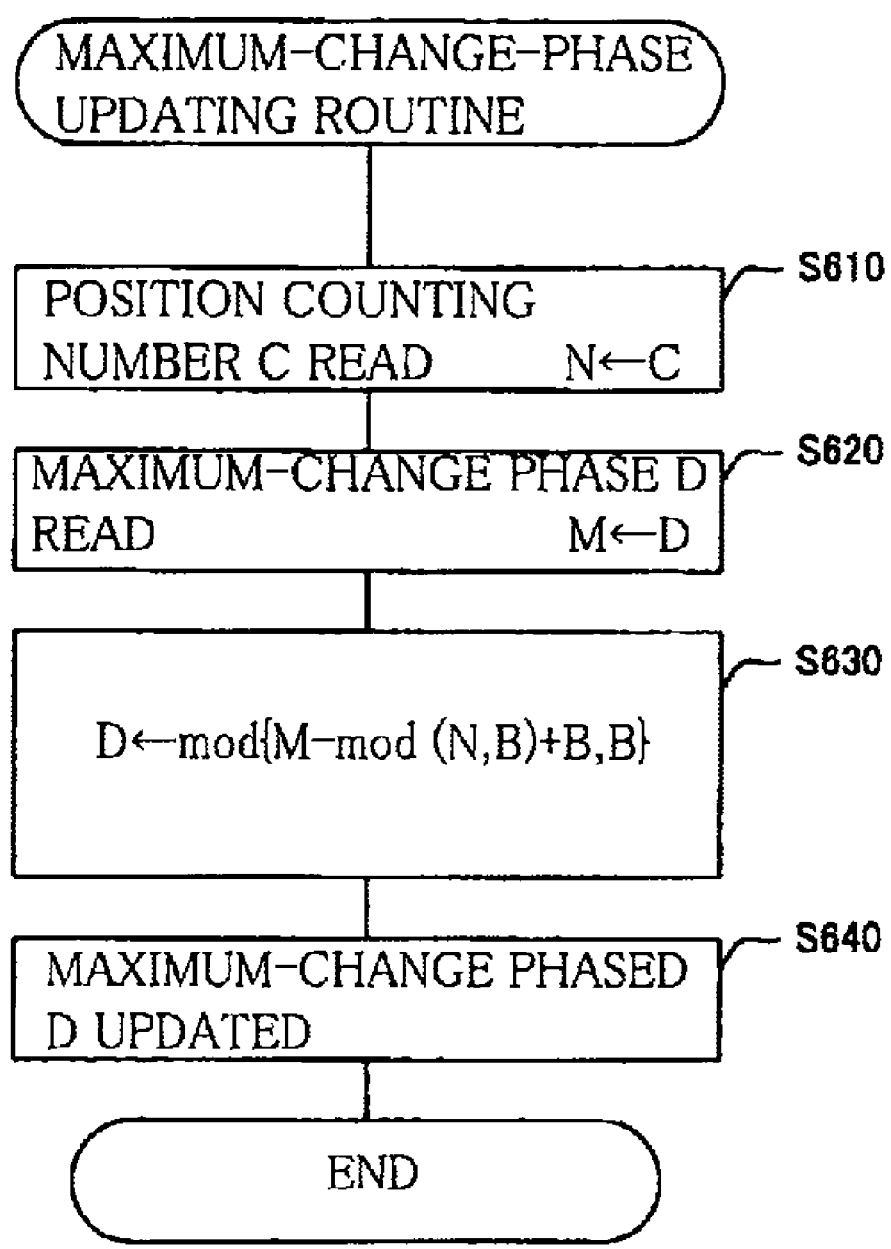
FIG. 9 is a flow chart representing a maximum-change-phase updating routine that is implemented by the control system of FIG. 4.

FIG. 9 shows a flow chart representing a maximum-change-phase updating routine that is implemented by the maximum-change-phase updating portion 94. The maximum-change-phase updating portion 94 implements, according to a command supplied from the CPU 100, the maximum-change-phase updating routine, each time the number C counted by the position detecting portion 92 is reset to zero, C=0. First, at Step S610, the updating portion 94 reads the current number C counted by the position detecting portion 92 (i.e., the number C immediately before the resetting), and sets the read number C as a value, N.

Next, at Step S620, the updating portion 94 reads the maximum-change phase D from the register 87, and sets the read phase D as a value, M. Subsequently, at Step S630, the updating portion 94 calculates an updated maximum-change phase D after the resetting, according to the following expression (3) including, as parameters, the values N, M set at Steps S610 and S620 and the periodic-change period B:

$$D=\mod\{M-\mod(N,B)+B,B\} \quad (3)$$

Subsequently, at Step S640, the updating portion 94 writes the updated maximum-change phase D, in the register 87, so as to update the maximum-change phase D. Thus, even if the number C counted by the position detecting portion 94 may be reset to zero, C=0, the register 87 can store the maximum-change phase D corresponding to the current number C counted by the position detecting portion 92. Thus, the current phase of the periodic change can be monitored with accuracy at any time.

As is apparent from the foregoing description of the MFD 1, the correction-amount setting device 120 sets, when the recording sheet P is fed in each of a plurality of sheet feeding operations, the control-end position of the LF motor 54 corrected based on the returning amount α1, if the backward force (i.e., the backward tension) is exerted to the recording sheet P. In addition, the setting device 120 sets (a) the variable position-correction amount F that prevents the error of the actual stop position of the sheet feeding roller 50, caused by the periodic rotation-speed change of the driving system of the sheet feeding roller 50, and (b) the offset electric current I that prevents the unavailable position range from occurring to the sheet feeding roller 50 because of the backward force and the periodic rotation-speed change. Thus, the setting device 120 corrects the control-end position of the first control mode, and supplies the offset current I, as needed, to the LF motor 54 after the end of the first control mode.

On the other hand, if the forward force (i.e., the sheet-feeding-direction tension) is exerted to the recording sheet P, the correction-amount setting device 120 sets the control-end position of the LF motor 54 corrected based on the advancing amount α2. In addition, the setting device 120 sets (a) the variable position-correction amount F that prevents the error of the actual stop position of the sheet feeding roller 50, caused by the periodic rotation-speed change of the driving system of the sheet feeding roller 50, and (b) the offset electric current I that prevents the unavailable position range from occurring to the sheet feeding roller 50 because of the forward force and the periodic rotation-speed change Thus, the setting device 120 corrects the control-end position of the first control mode, and supplies the offset current I, as needed, to the LF motor 54 after the end of the first control mode.

In the present embodiment, even if, when the recording head 4 records the image on the recording sheet P, the sheet supplying system may exert the backward tension to the sheet P, or the sheet discharging system may exert the forward tension to the sheet P, while the periodic rotation-speed change occurs to the driving system of the sheet feeding roller 50, the recording sheet P can be reliably stopped at the image-recording position as the target stop position.

In the present embodiment, when the recording sheet P is fed, the backward tension or the forward tension is selectively exerted to the sheet P, so as to adversely influence the actual stop position of the sheet P. However, there is known some sorts of image recording apparatuses in which only one of the backward tension and the forward tension is exerted to each recording sheet P. In those cases, either Steps S410 and S420 (FIG. 8), or Steps S430 and S440 are carried out to deal with the adverse influence caused by the tension in issue, and default values are set in place of the parameters to deal with the other tension.

Next, there will be described a second embodiment of the present invention.

The second embodiment also relates to a multi-function device (MFD). The MFD as the second embodiment has a construction basically same as that of the MFD 1 shown in FIGS. 1 through 3, and accordingly only differences between the first and second embodiments will be described below. The same reference numerals as used in the first embodiment are used to designate the corresponding elements or parts of the second embodiment, and the description thereof is omitted.

Figure 15:
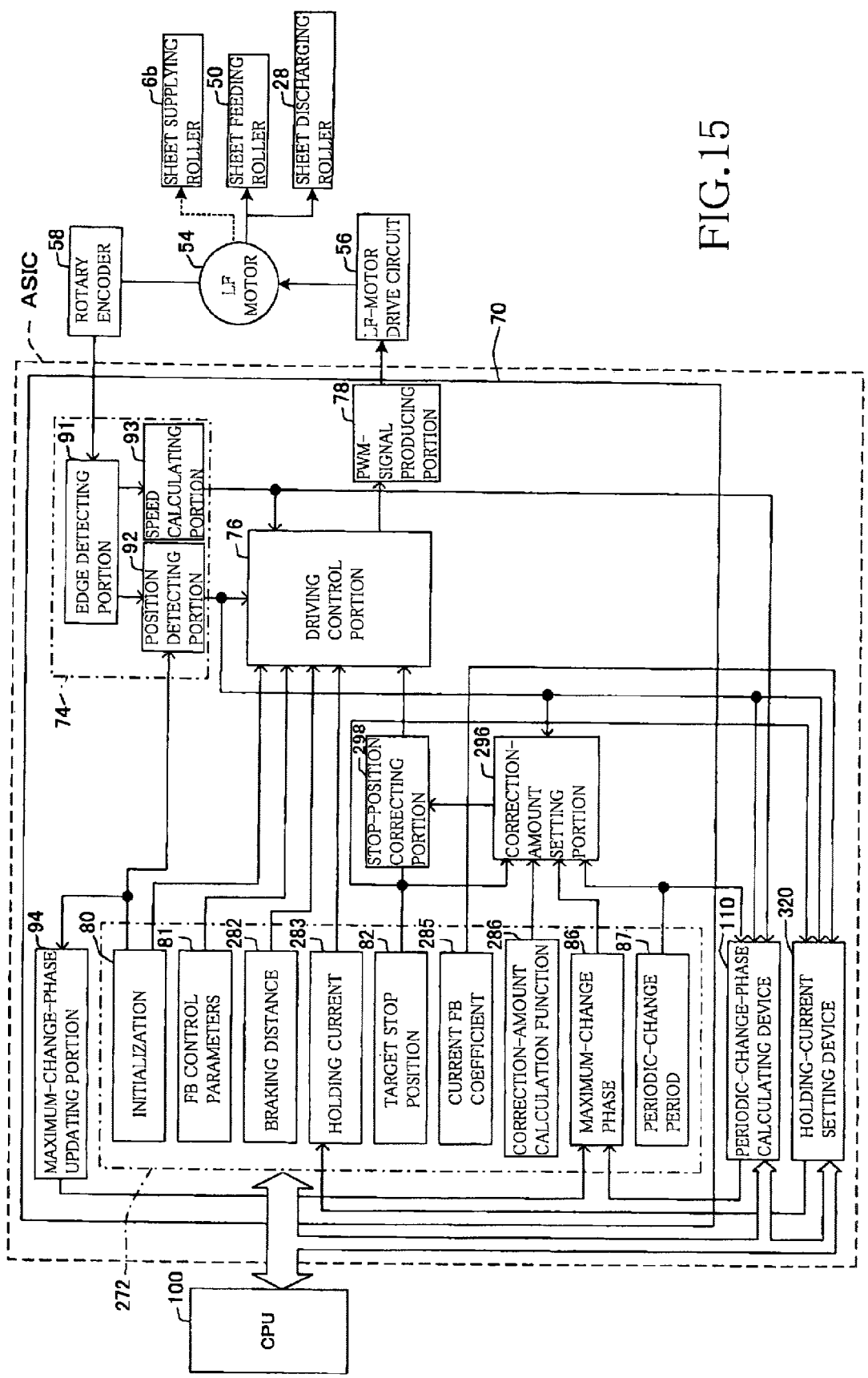
FIG. 15 is a block diagram corresponding to FIG. 4, and showing a control system of another MFD as a second embodiment of the present invention.

FIG. 15 is a block diagram showing a control system that controls, according to a command supplied from a CPU 100, an LF (line feed) motor 54 so as to feed a recording sheet P in the manner described above in connection with the first embodiment.

In the second embodiment, a group of registers 272 include a register 80 that stores a start command to start an operation of a sheet-feeding control device 70; a register 81 that stores FB (feedback) control parameters including various control gains (e.g., a proportional gain and an integral gain) that are needed to perform a FB control with respect to the rotation speed of the LF motor 54; a register 282 that stores a braking distance, α, from a control-end position where a first control mode of the driving control of the LF motor 54 ends to a position where the rotation of the LF motor 54 (or a sheet feeding roller 50) is actually stopped by supplying of a holding electric current, I, described later, to the LF motor 54; a register 283 that stores the holding current I to be supplied to the LF motor 54 in a second control mode after the first control mode of the LF motor 54 ends; a register 82 that stores a target stop position of the IF motor 54 (or the sheet feeding roller 50) (i.e., a feeding-amount number, Cf, indicating a rotation amount of the LF motor 54 from a start of the first control mode of the same 54); a register 285 that stores a holding-current FB coefficient, k, that is needed for a feedback control of the holding current I in accordance with an error of the actual stop position of the LF motor 54 (or the sheet feeding roller 50) from the target stop position thereof a register 286 that stores a correction-amount calculating function, f(Cdd), that is needed to calculate a correction amount, F, used to correct an error of the actual stop position of the sheet feeding roller 50 from the target stop position of the roller 50, the error being caused by a periodic rotation-speed (or torque) change occurring to a driving system of the sheet feeding roller 50 (e.g., a periodic rotation-speed change resulting from cogging of the LF motor 54); a register 86 that stores a maximum-change phase, D, indicating an angular phase at which the periodic rotation-speed change occurring to the driving system of the sheet feeding roller 50 takes a maximum deviation from a reference rotation speed; and a register 87 that stores a periodic-change period, B, indicating a length of each of a plurality of cycles of the periodic change. Hereinafter, the periodic rotation-speed change occurring to the driving system of the sheet feeding roller 50 will be simply referred to as the "periodic change", where appropriate.

Out of the various parameters registered by the group of registers 72, all the parameters, except for the holding current I stored by the register 283 and the maximum-change phase D stored by the register 86, are supplied thereto from the CPU 100; the holding current I is set or updated by a holding-current setting device 320 as a different portion of an ASIC than the sheet-feeding control device 70, each time the LF motor 54 is driven or operated to perform a sheet feeding operation; and the maximum-change phase D is initially set by a periodic-change-phase calculating device 110 as a different portion of the ASIC than the sheet-feeding control device 70, when the operation of the MFD 1 is started.

In the present embodiment, the register 86 storing the maximum-change phase D, the register 87 storing the period-change period B set by the CPU 100, and the CPU 100 (or a ROM thereof) storing the period-change period B to be set to the register 87 cooperate with each other to constitute a periodic-change-characteristic memory; and the periodic-change-phase calculating device 110 constitutes a periodic-change-phase calculating portion.

In addition, the sheet-feeding control device 70 includes a correction-amount setting portion 296 that calculates the correction amount F used to correct the target stop position of the sheet feeding roller 50 (i.e., the feeding-amount number Cf), stored by the register 82, based on the correction-amount calculating function f(Cdd), the maximum-change phase D, and the periodic-change period B, respectively stored by the registers 286, 86, 87, in each of the sheet feeding operations in which the sheet feeding roller 50 is driven and stopped. The sheet-feeding control device 70 additionally includes a stop-position correcting portion 298 that corrects, using the correction amount F set by the correction-amount setting portion 296, the target stop position (or the feeding-amount number Cf) stored by the register 82, and inputs the corrected target stop position to a driving control portion 76. In the present embodiment, the correction-amount setting portion 296 corresponds to a phase-difference calculating portion; and the stop-position correcting portion 298 corresponds to a control-end-position correcting portion. That is, the stop-position correcting portion 298 corrects the target stop position (or the feeding-amount number Cf), and thereby corrects the control-end position where the first control mode of the driving control of the LF motor 54 is ended.

The target stop position corrected by the stop-position correcting portion 298 is inputted, together with the FB control parameters, the braking distance α, and the holding current I, to the driving control portion 76, and the driving control portion 76 controls or drives, using the inputted parameters, the LF motor 54.

Hereinafter, there will be described an operation of each of the periodic-change-phase calculating device 110, the driving control portion 76, the holding-current setting device 320, the correction-amount setting portion 296, the stop-position correcting portion 298, and the maximum-change-phase updating portion 94 that cooperate with each other to constitute a relevant portion of the control system of the LF motor 54 or the sheet feeding roller 50. Those elements 110, 76, 320, 296, 298, 94 are provided as respective portions of the ASIC. However, those elements 110, 76, 320, 296, 298, 94 may be provided in the form of software, i.e., control programs that are implemented by the CPU 100, i.e., the microcomputer including the CPU 100. Therefore, here, the respective operations of those elements 110, 76, 320, 296, 298, 94 are described by reference to flow charts, shown in FIGS. 5, 16, 17, 18, and 9, that represent those control programs, respectively. However, since the control programs that are represented by the flow charts shown in FIGS. 5 and 9 and are implemented by the elements 110 and 94 have been described above with respect to the first embodiment, the description thereof is omitted.

Figure 16:
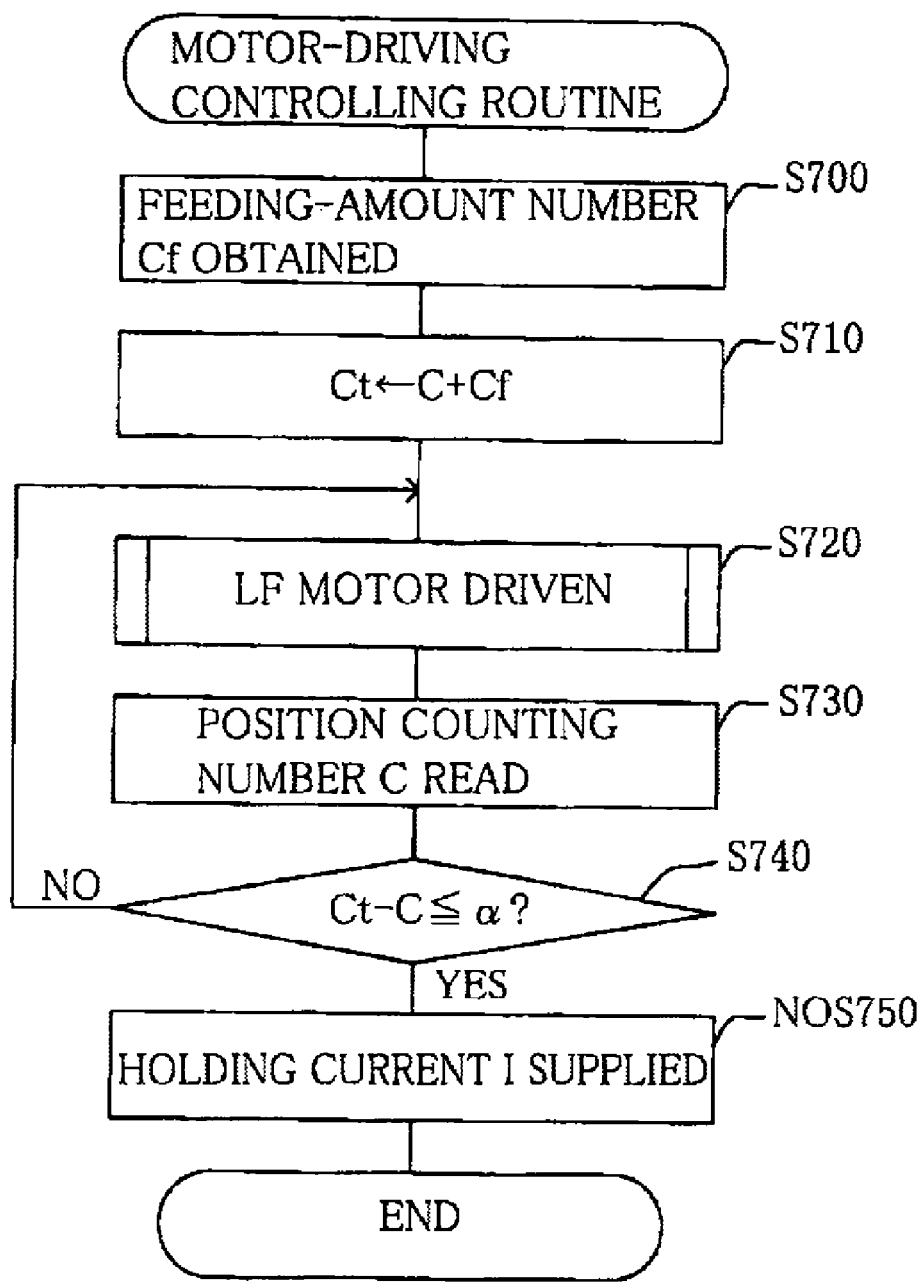
FIG. 16 is a flow chart corresponding to FIG. 7, and representing a motor-driving controlling routine that is implemented by the control system of FIG. 15.

FIG. 16 shows a flow chart representing a motor-driving controlling program that is implemented by the driving control portion 76 when a recording portion 7 records an image on a recording sheet P. In FIG. 16, first, at Step S700, the driving control portion 76 reads the target stop position corrected by the stop-position correcting portion 298, i.e., the corrected feeding-amount number Cf, described later. Subsequently, at Step S710, the control portion 76 adds the corrected feeding-amount number Cf to a current number C counted by a position detecting portion 92, so as to calculate a target-stop-position number, Ct, where the rotation of the LF motor 54 (or the sheet feeding roller 50) is to be stopped.

Figure 10A:
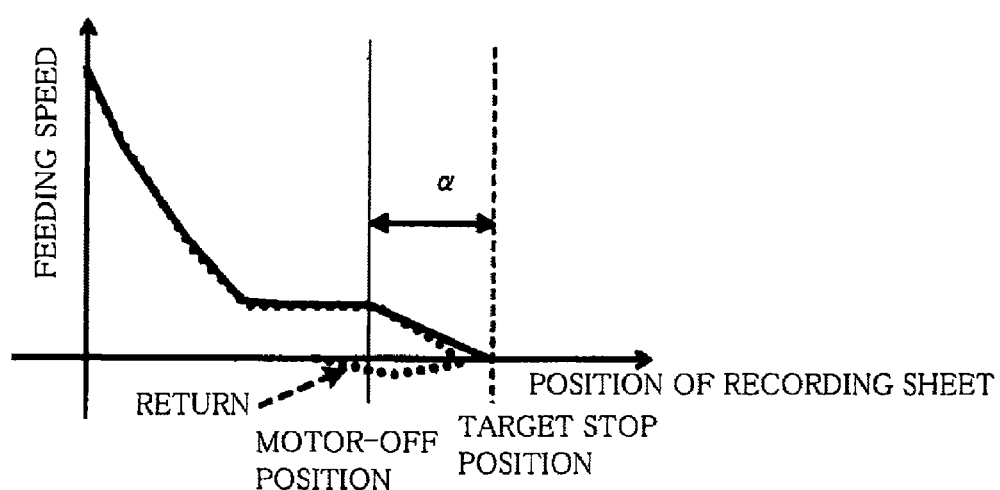
FIG. 10A is a graph for explaining a problem that is caused by a backward tension exerted to a recording sheet in a conventional image forming device.
Figure 10B:
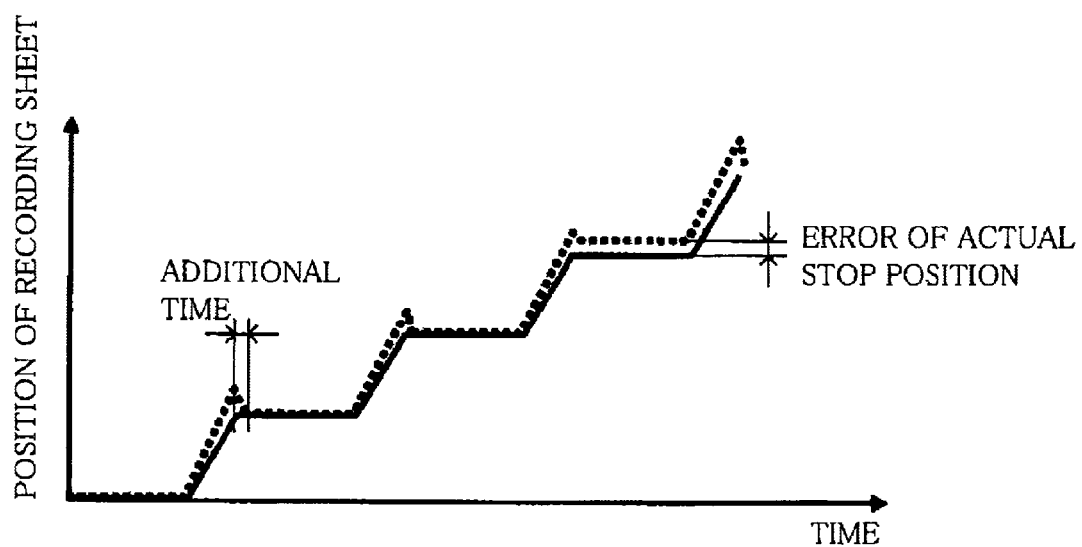
FIG. 10B is a graph for explaining other problems that are caused by the backward tension.
Figure 11A:
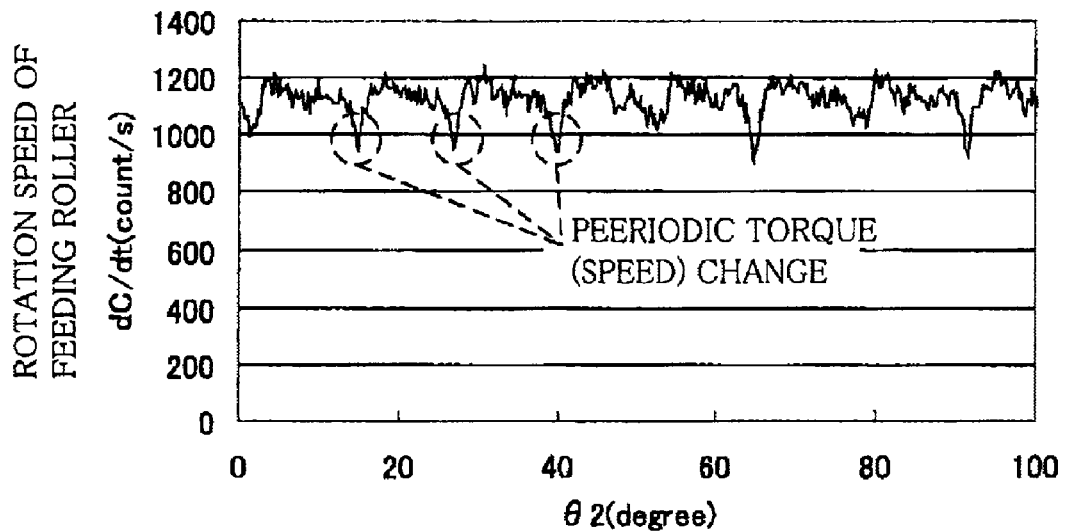
FIG. 11A is a graph for explaining a periodic torque (rotation-speed) change occurring to an electric motor or a sheet feeding roller of the MFD.
Figure 11B:
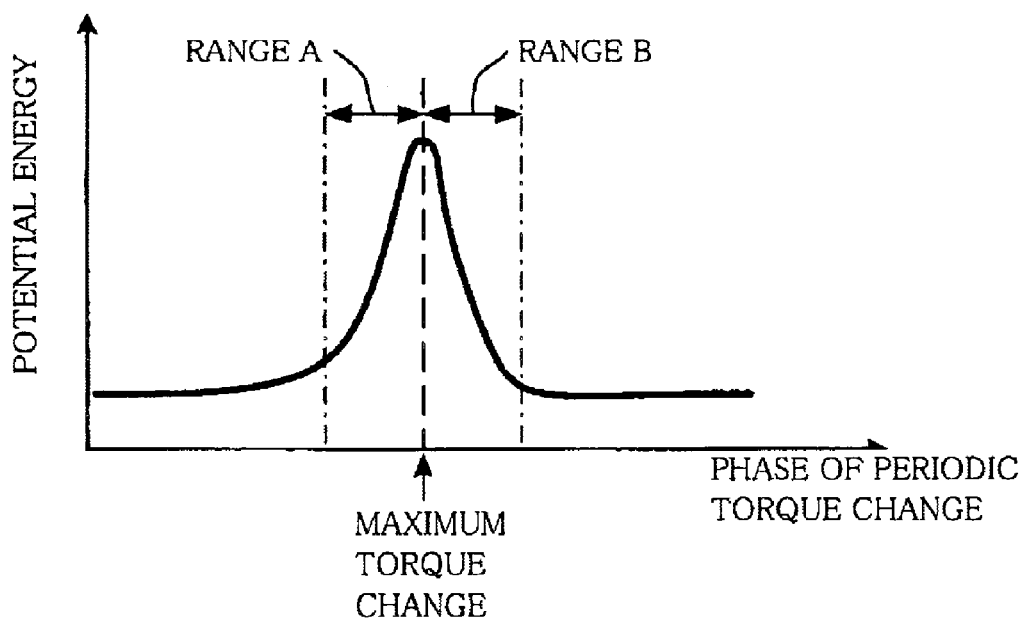
FIG. 11B is a graph for explaining a problem that is caused by a combination of the periodic torque change and the backward tension or a forward tension that is exerted to the recording sheet.
Figure 12A:
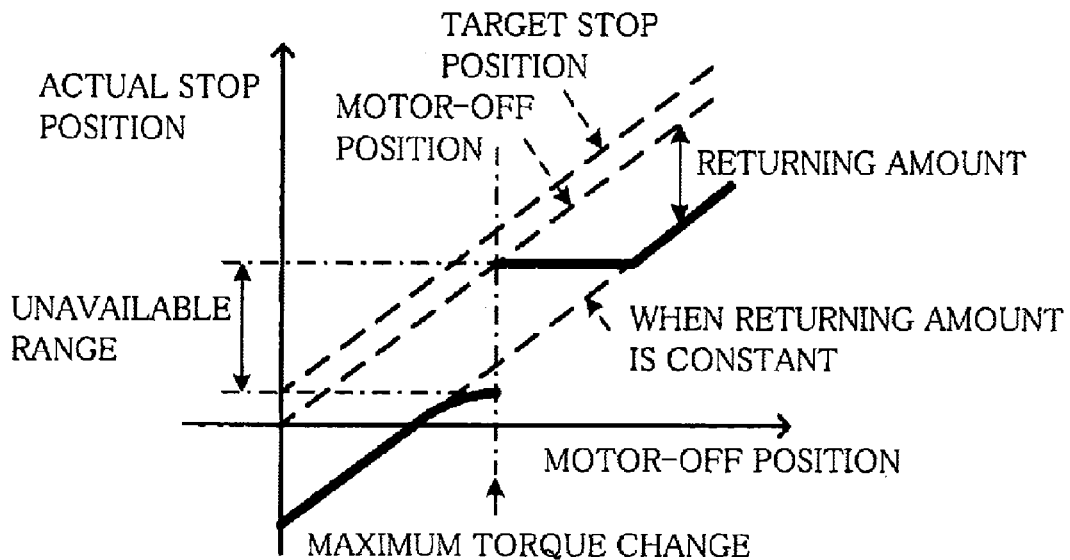
FIG. 12A is a graph for explaining an unavailable stop-position range occurring to the sheet feeding roller because of the combination of the periodic torque change and the backward tension.
Figure 12B:
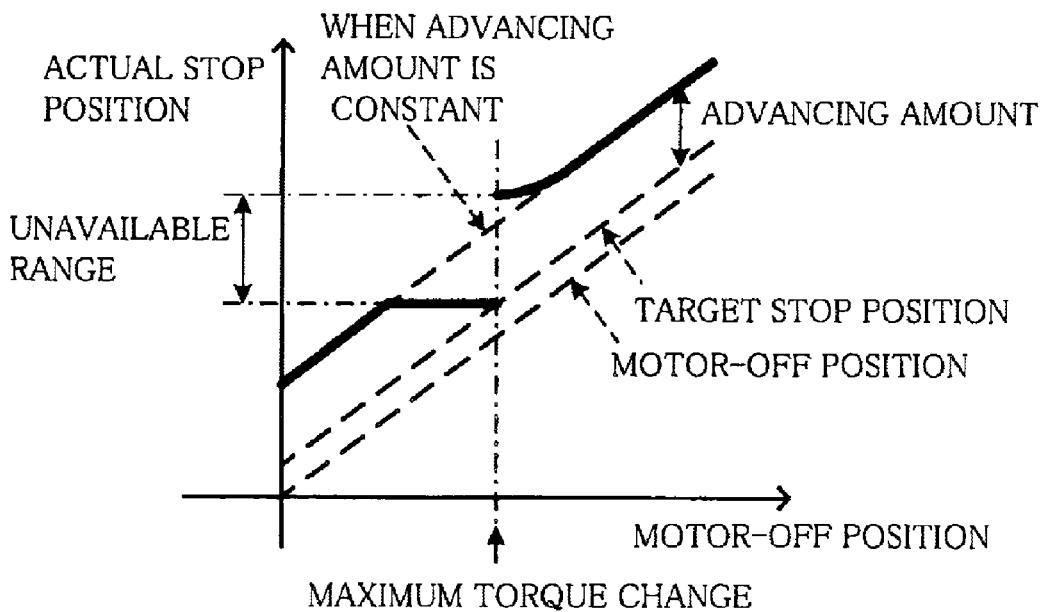
FIG. 12B is a graph for explaining another unavailable stop-position range occurring to the feeding roller because of the combination of the periodic torque change and the forward tension.

Subsequently, at Step S720, the control portion 76 controls or drives, in the first control mode, the LF motor 54 in the forward direction to rotate the sheet feeding roller 50 in the sheet-feeding rotation direction, and decreases a rotation speed of the LF motor 54 down to an extremely low speed near stopping, before the number C counted by the position detecting portion 92 reaches the target-stop-position number Ct, calculated at Step S710, as shown in FIG. 10A.

During the first control mode of the driving control of the LF motor 54, the control portion 76 reads, at Step S730, the current number C counted by the position detecting portion 92, and then judges, at Step S740, whether a number, (Ct−C), obtained by subtracting the current number C from the target-stop-position number Ct, is equal to, or smaller than, the braking distance cc stored by the register 282. Thus, the control portion 92 judges whether the current position (i.e., the current rotation amount) of the LF motor 54 has reached the control-end position where the first control mode of the driving control of the LF motor 54 is to be ended.

If a negative judgment is made at Step S740, then the control portion 76 repeats Steps S720 and Step 730 to continue the first control mode of the driving control of the LF motor 54. Meanwhile, if a positive judgment is made at Step S740, the control of the control portion 76 goes to Step S750 to change, in the second control mode, the electric current supplied to the LF motor 54, to the holding electric current I stored by the register 283, and then ends the current sheet-feeding operation of the LF motor 54 that corresponds to one-time scanning of a recording head 4 across the recording sheet P.

Figure 17:
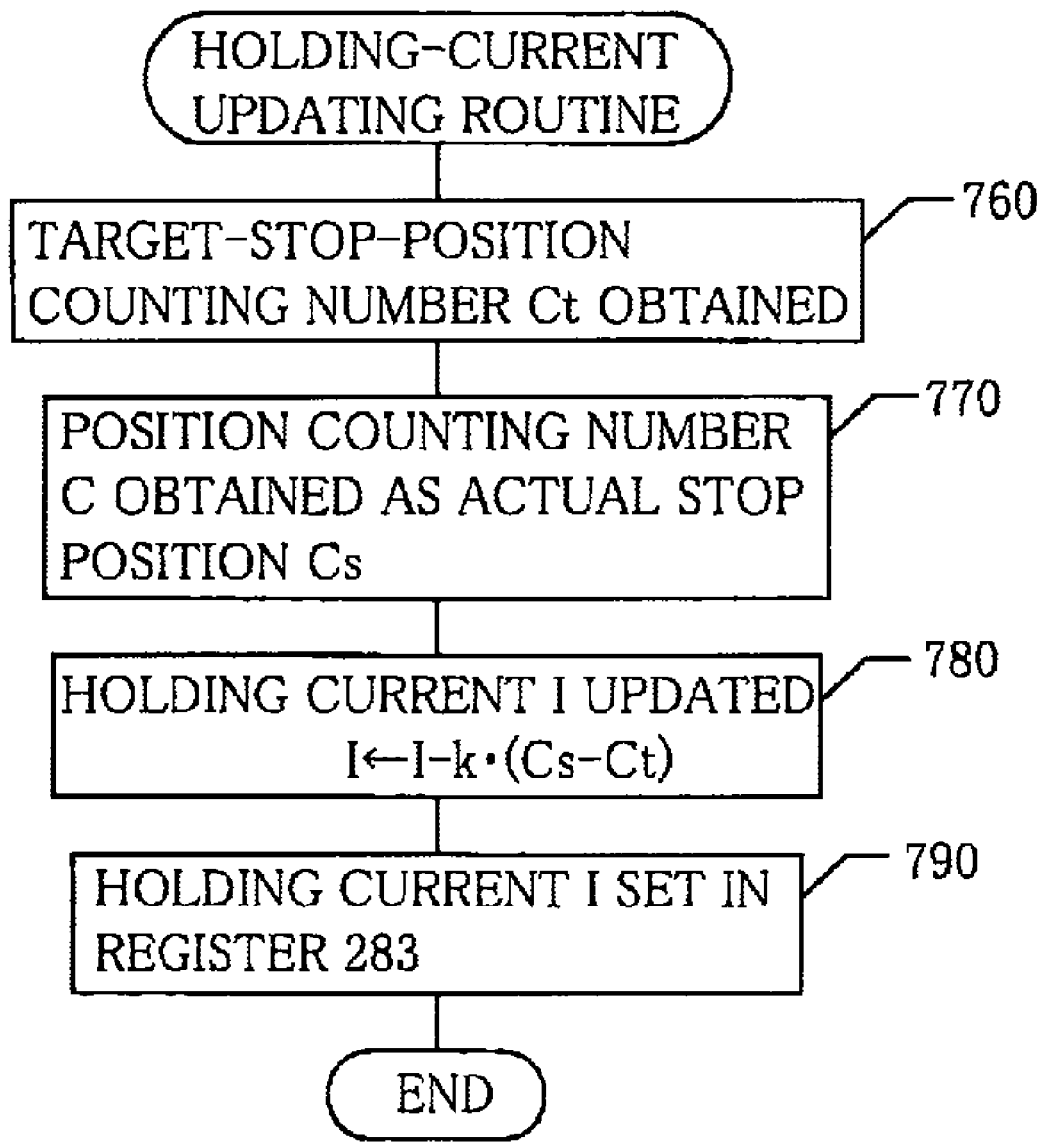
FIG. 17 is a flow chart representing a holding electric current updating routine that is implemented by the control system of FIG. 15.

Next, FIG. 17 shows a flow chart representing a holding-current updating routine that is implemented by the holding-current setting device 320. The holding-current setting device 320 implements the holding-current updating routine, each time the driving control portion 76 implements the motor-driving controlling routine, shown in FIG. 16, so as to feed the recording sheet P.

In the holding-current updating routine, first, at Step S760, the setting device 320 obtains the target-stop-position number Ct that has been set at Step S710 by the driving control portion 76 when the motor-driving controlling routine, shown in FIG. 16, is implemented by the same 76. Subsequently, at Step S770, the setting device 320 reads the current number C counted by the position detecting portion 92, as an actual-stop-position number, Cs, indicating an actual stop position of the LF motor 54 or the sheet feeding roller 50 where the motor 54 or the roller 50 is actually stopped as a result of supplying of the holding current I at Step S750.

Subsequently, at Step S780, the setting device 320 reads the holding-current FB coefficient k from the register 285, and updates the current holding current I stored by the register 283, according to the following expression (4) including, as parameters, the holding-current FB coefficient k, the current holding current I, the target-stop-position number Ct, and the actual-stop-position number Cs:

$$I \leftarrow I - k \cdot (Cs - Ct) \tag{4}$$

Then, at Step S790, the setting device 320 writes the updated holding current I in the register 283, and quits the present routine.

Thus, the holding current I is feed-back controlled such that the actual stop position of the LF motor 54 when the motor 54 is driven by the driving control portion 76 in the first control mode of each sheet feeding operation coincides with the target stop position indicated by the CPU 100. That is, the holding current I is updated to an optimum value to control the LF motor 54 (or the sheet feeding roller 50) to stop at the target stop position in each sheet feeding operation, so that the recording head 4 can record an image at a target position on the recording sheet P.

Figure 18:
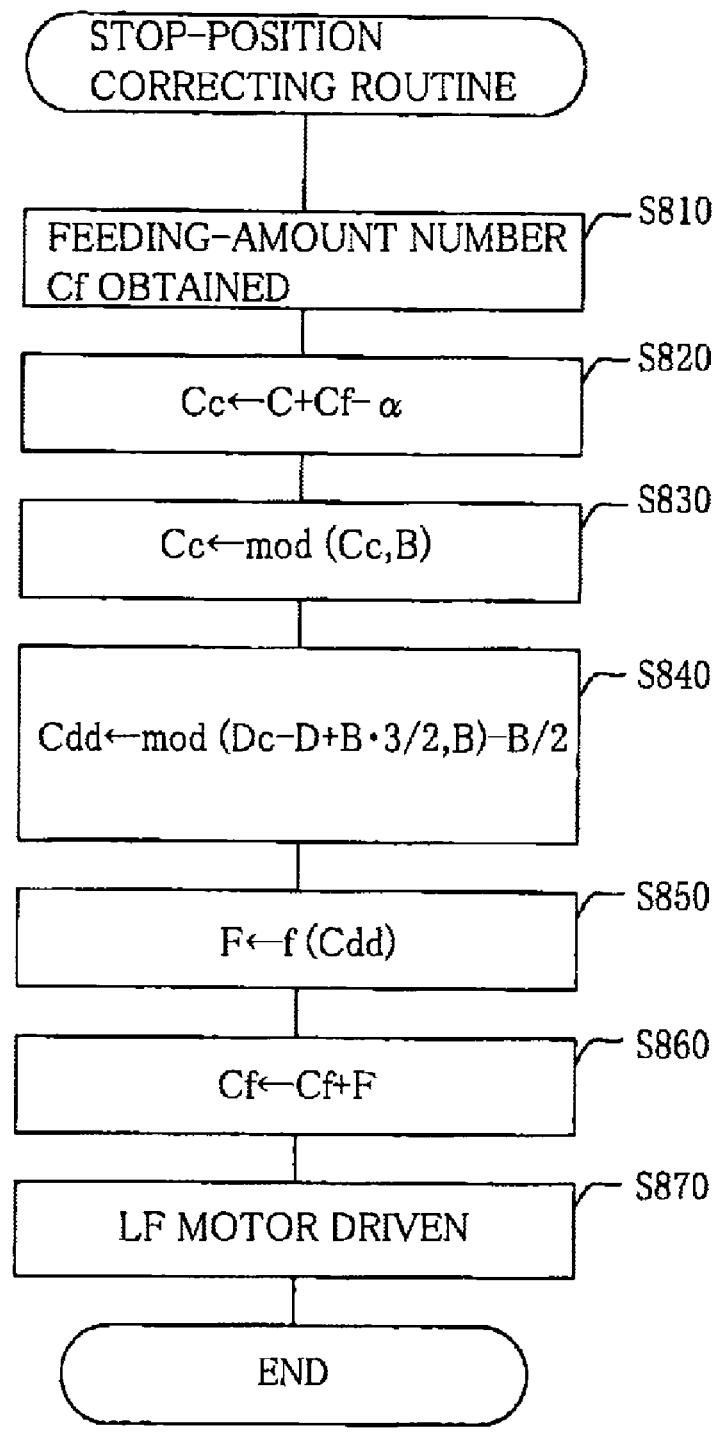
FIG. 18 is a flow chart representing a target-stop-position correcting routine that is implemented by the control system of FIG. 15.

Next, FIG. 18 shows a flow chart representing a stop-position correcting routine that is implemented by the correction-amount setting portion 296 and the stop-position correcting portion 298.

In the stop-position correcting routine, first, at Step S810, the setting portion 296 reads, from the register 82, the feeding-amount number Cf indicating the target stop position of the LF motor 54. Then, at Step S820, the setting portion 296 calculates, based on the current number C counted by the position detecting portion 92, the feeding-amount number Cf, and the braking distance a stored by the register 282, a control-end-position number, Cc (=C+Cf−α), that indicates the control-end position where the driving control portion 76 ends the first control mode of the driving control of the LF motor 54, i.e., ends the supplying of electric current to the motor 54, according to the motor-driving controlling routine shown in FIG. 16.

Then, at Step S830, the setting portion 296 calculates a phase, Dc, of the periodic change that corresponds to the control-end position (i.e., the control-end-position number Cc), according to the above-described expression (1).

Subsequently, at Step S840, the setting portion 296 calculates a phase difference, Cdd, of the control-end-position phase Dc obtained at Step S830, and the maximum-change phase D, according to the above-described expression (2). Thus, the phase difference Cdd is obtained as a value that falls in a range of 0±B/2 where the phase difference "Cdd=0" corresponds to the maximum-change phase D as a reference phase.

Then, at Step S850, the setting portion 296 reads the correction-amount calculating function f(x) from the register 286, substitutes a parameter x of the function f(x) with the phase difference Cdd obtained at Step S840, so as to calculate a stop-position correction amount, F {=f(Cdd)}.

Figure 19:
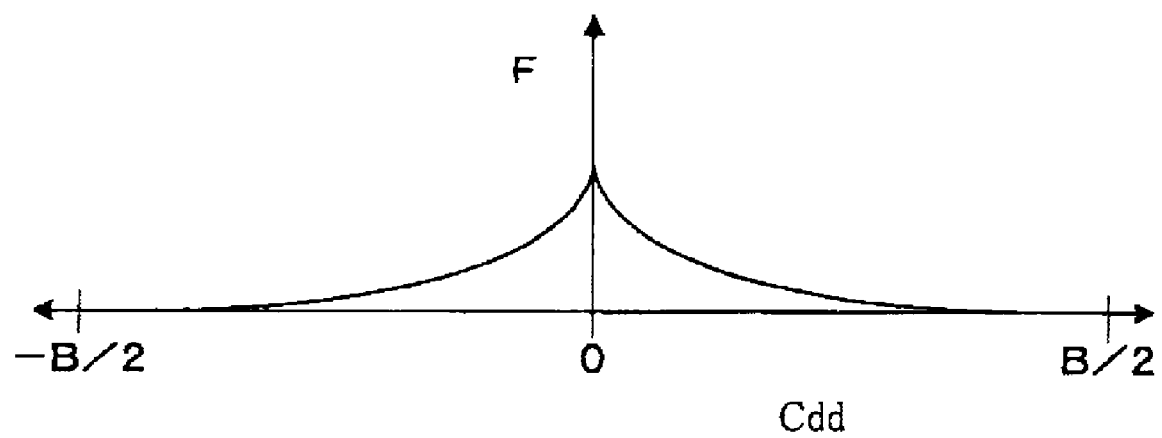
FIG. 19 is a graph for explaining a target-stop-position correcting function that is used in the target-stop-position correcting routine.

As shown in FIG. 19, the correction-amount calculating function f(x) has such a characteristic that the smaller an absolute value of the phase difference Cdd is, i.e., the nearer the control-end-position phase Dc is to the maximum-change phase D, the greater the stop-position correction amount F is, because the nearer the control-end position is to the maximum-change phase D, the greater the error of the actual stop position from the target stop position is. Therefore, in the present embodiment, the control-end position is delayed by the positional error, so that the LF motor 54 may be stopped at the target stop position indicated by the CPU 100.

That is, at Step S860, the correcting portion 298 adds the stop-position correction amount F obtained at Step S850, to the feeding-amount number Cf representing the target stop position indicated by the CPU 100, so that when the driving control portion 76 implements the motor-driving controlling operation shown in FIG. 16, the control-end position is delayed by the positional error. Subsequently, at Step S870, the correcting portion 298 commands the driving control portion 76 to start driving the LF motor 54 in the first control mode.

Thus, in the present embodiment, even if the periodic rotation-speed change resulting from, e.g., the cogging of the LF motor 54 may occur to the driving system of the sheet feeding roller 50, the recording sheet P can be reliably fed to, and stopped at, the image-recording position as the target stop position, without being adversely influenced by the periodic change.

In the present embodiment, a portion of the correction-amount setting portion 296 that carries out Steps S810 through S840 constitutes a phase-difference calculating portion; and a portion of the correction-amount setting portion 296 that carries out Step S850, and a portion of the stop-position correcting portion 298 that carries out Step S860 constitutes a control-end-position correcting portion.

As is apparent from the foregoing description of the second embodiment, the MFD is not operated in such a manner that each time the recording sheet P is fed by one line to record a one-line image on the sheet P, the supplying of electric current to the LF motor 54 is stopped, but is operated in such a manner that even if the feeding of the recording sheet P (i.e., the first control mode of the driving control of the LF motor 54) may end, the holding current I is supplied to the LF motor 54 in the second control mode. In addition, the holding current I is feed-back controlled to take the optimum value, by feeding back the error of the actual stop position from the target stop position each time the recording sheet P is fed by one line.

Therefore, in the second embodiment, even if a backward tension or force that is produced by, e.g., frictions of the sheet supplying roller 6b or the sheet supplying system that supplies the recording sheet P, may be exerted to the sheet P, in the backward direction opposite to the sheet feeding direction, the LF motor 54 can be driven to produce a resisting force resisting the backward force, so as to prevent the sheet P from being moved backward. Similarly, even if a forward tension or force that is produced by, e.g., rotation of a sheet discharging roller 28 may be exerted to the sheet P, in the forward direction same as the sheet feeding direction, the LF motor 54 can be driven to produce a resisting force resisting the forward force, so as to prevent the sheet P from being moved forward. Thus, the recording sheet P can be accurately and quickly fed to the target image-recording position.

In addition, in the present embodiment, the register 86 registers the maximum-change phase D indicating the angular phase at which the periodic rotation-speed change occurring to the sheet feeding roller 50 because of, e.g. the cogging of the LF motor 54, takes the maximum value. Each time the recording sheet P is fed by one line so that the recording head 4 may record a one-line image on the sheet P, the phase difference Cdd is obtained as the difference of the maximum-change phase D and the periodic-change phase Dc corresponding to the control-end position where the first control mode of the driving control of the LF motor 54 ends, and the control-end position is corrected such that the smaller the absolute value of the phase difference Cdd is, the more the amount of delaying of the control-end position is.

Thus, in the second embodiment, the recording sheet P can be fed to, and stopped at, the target image-recording position, without being adversely influenced by the periodic rotation-speed change occurring to the driving system of the sheet feeding roller 50.

In each of the first and second embodiments, each time an electric power is initially applied to the MFD and the control system thereof is started, the periodic-change-phase calculating device 110 actually drives or rotates the LF motor 54 and determines the maximum-change phase D of the periodic change counted from the reference rotation position of the motor 54. In addition, during the operation of the MFD, the maximum-change-phase updating portion 94 updates the maximum-change phase D so as to be able to correspond to the number C counted by the position detecting portion 92, each time the counted number C is reset to C=0. Therefore, the accurate control-end-position phase Dc of the periodic change can be obtained from the number C counted by the position detecting portion 92, and accordingly the LF motor 54 can be controlled with improved accuracy.

In each of the first and second embodiments, the present invention is applied to the driving control of the LF motor 54 employed by the MFD including the inkjet-type recording portion 7. However, the principle of the present invention is applicable to any sort of object feeding apparatus that employs a motor, and a feeder (i.e., a feeding member) that is driven or operated by the motor to feed an object little by little.

In the first embodiment, the controller includes switching portion (Steps S400, S420, S440) that recognizes, based on the current position of the recording sheet P as the object that is detected by the position detecting portion 92 as the operation-amount detector, which one of the backward and forward tensions as the first and second external forces is exerted to the sheet P, and that carries out, based on the recognized one of the backward and forward tensions, a corresponding one of Step S420 and Step S440 as the first second-power supplying portion and the second second-power supplying portion to supply the offset electric current fy(Cdd') as the second power to the LF motor 54.

In the first embodiment, even if the current position of the recording sheet P as the object that is fed by the feeding roller 50 as the feeder may be changed and accordingly the direction in which the tension as the external force is exerted to the sheet P may be changed, i.e., reversed, the target stop position of the sheet P can be continuously changed by the control device 70 and the CPU 100 by supplying the plus or minus offset current as the second power after the supplying of the feeding electric current as the first power to the LF motor 54 ends at as the motor-off position as the control-end position. Thus, the MFD 1 is free of the problem of the conventional feeding apparatus that the unavailable stop-position range occurs to the feeding roller, and accordingly can feed the object to any target, i.e., desired stop position.

As a feeding apparatus wherein a direction in which an external force is exerted to an object may be reversed depending upon a current position of the object fed by a feeder, there is known, e.g., such a feeding apparatus wherein a recording medium such as a recording sheet is fed by a feeding roller to an image-recording position such that when the recording sheet is located on the side of a sheet-supplying device, an external tension is exerted, because of, e.g., resistance produced in the sheet-supplying device, to the recording sheet in the backward direction opposite to the feeding direction; and when the recording of image on the recording medium is performed and the medium receives a pulling force from a sheet-discharging roller provided downstream of the feeding roller, an external tension is exerted to the medium to the roller in the forward direction, i.e., in the feeding direction.

In the first embodiment, the controller further includes a control-end-position correcting portion (S490, S500) that corrects, based on a difference of the phase Dc of the control-end point corresponding to the motor-off position and the phase D of the maximum-deviation point, the control-end position, C+Cf−α, to a corrected control-end position, C+Cf−α+F, and a phase comparing portion (S500) determines a phase, Dc+F, of a corrected control-end point of the periodic operation-speed change that corresponds to the corrected control-end position, and compares the thus determined phase of the corrected control-end point and the phase D of the maximum-deviation point with each other.

In the first embodiment, since the plus or minus offset electric current determined based on the difference Cdd' of the phase Dc+F of the corrected control-end point and the phase D of the maximum-deviation point is supplied to the LF motor 54, so as to produce the resisting force resisting the external tension exerted to the recording sheet P, the control device 70 can accurately stop the feeding roller 54 at the target stop position Cf.

Figure 13A:
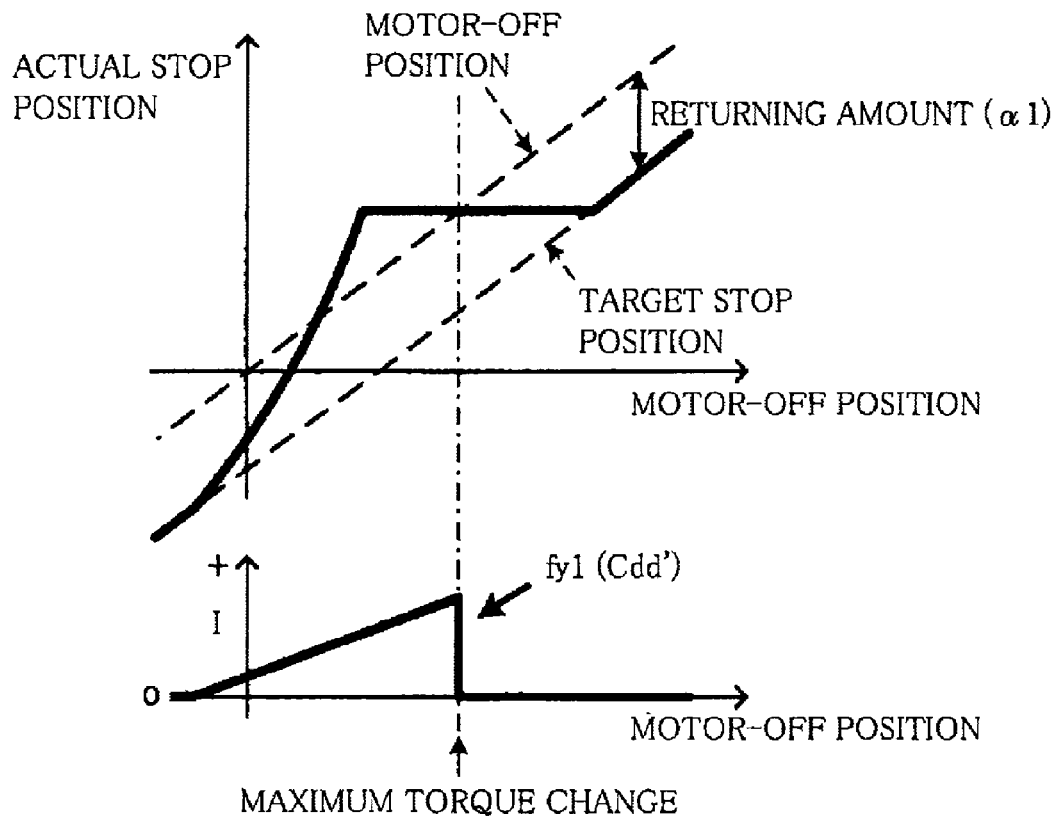
FIG. 13A is a graph for explaining an offset electric current, I, that is supplied, in a second control mode, to the electric motor so as to prevent the occurrence of the unavailable stop-position range because of the combination of the periodic torque change and the backward tension.
Figure 14A:
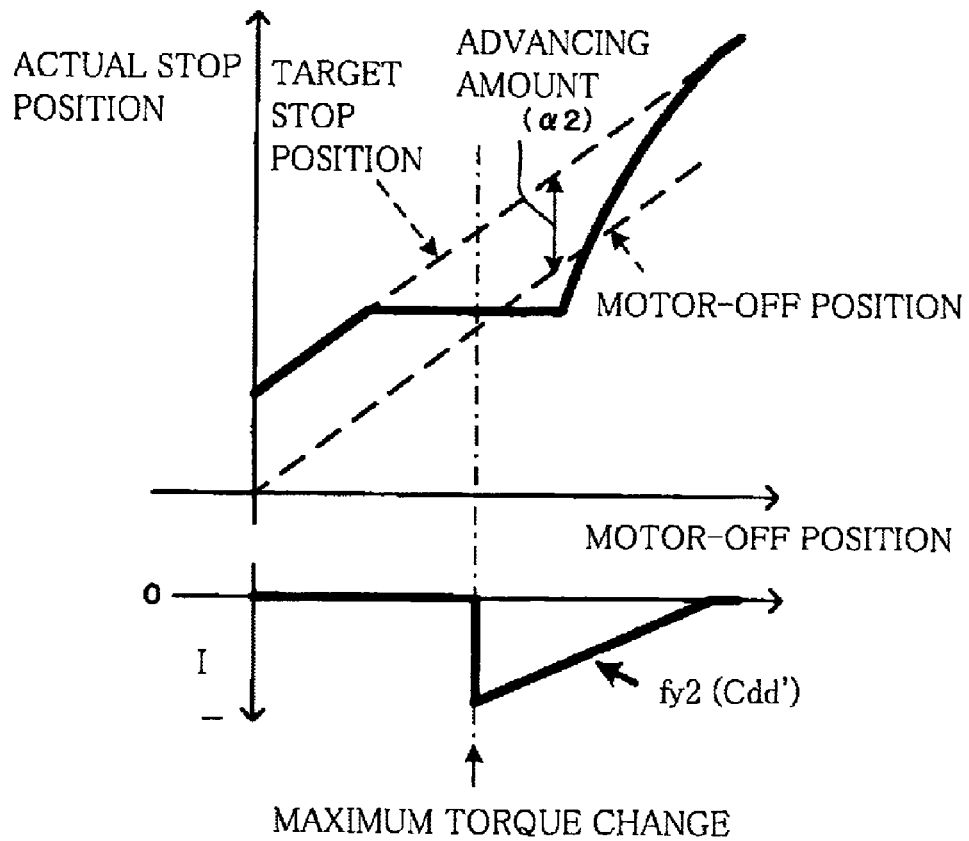
FIG. 14A is a graph for explaining an offset electric current, I, that is supplied to the electric motor so as to prevent the occurrence of the unavailable stop-position range because of the combination of the periodic torque change and the forward tension.

More specifically explained, since, as shown in FIG. 13A or 14A, the plus or minus offset electric current is supplied to the LF motor 54 so as to give the resisting force to the feeding roller 50, the feeding roller 50 can be stopped at an arbitrary target stop position, and the above-described unavailable stop-position range does not occur to the feeding roller 50. However, if only the offset electric current may be supplied to the LF motor 54, the feeding roller 50 may not be accurately stopped at the target stop position indicated by the CPU 100 or an external device.

Figure 13B:
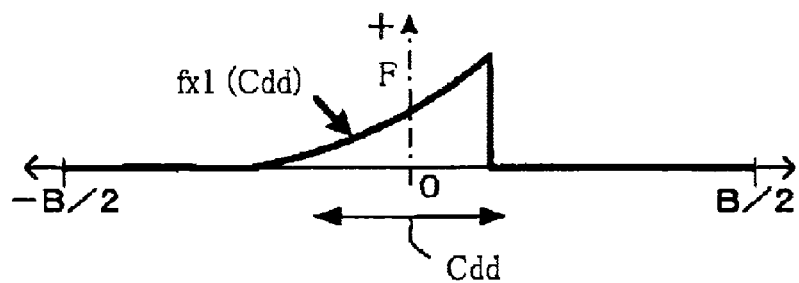
FIG. 13B is a graph for explaining a variable correction amount, F, to correct a motor-off position where the supplying of a feeding electric current to the electric motor in a first control mode is stopped, so as to calculate the offset electric current I to be supplied to the electric motor to prevent the occurrence of the unavailable stop-position range because of the combination of the periodic torque change and the backward tension.
Figure 14B:
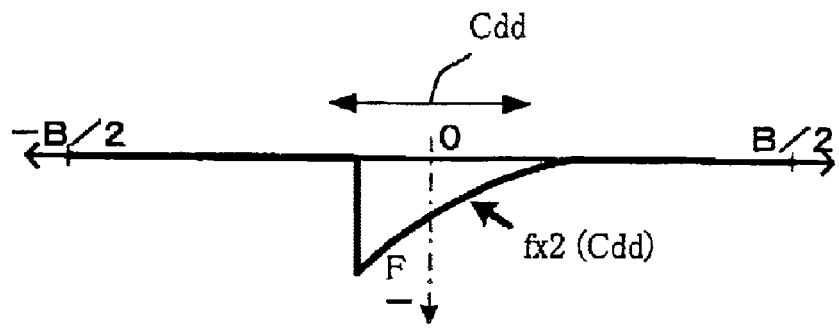
FIG. 14B is a graph for explaining a variable correction amount F to correct the motor-off position so as to calculate the offset electric current I to be supplied to the electric motor to prevent the occurrence of the unavailable stop-position range because of the combination of the periodic torque change and the forward tension.

The controller further includes a correction-amount calculating portion (S420, S440, S490) that may calculate an correction amount to correct the control-end position, according to a relationship (e.g., a map or a formula), as shown in FIG. 13B or 14B, that is predetermined based on a relationship between motor-off position (i.e., control-end position), and actual stop position of object, as shown in FIG. 13A or 14A.

In the first embodiment, the MFD 1 includes the periodic-change-phase calculating device 110 which drives, when the MFD 1 is initially started, the LF motor 54 to rotate the feeding roller 50, and determines, based on the plurality of operation amounts periodically detected by the position detecting portion 92, the maximum-deviation point of the periodic operation-speed change of the LF motor 54 or the feeding roller 50, and determines, based on the determined maximum-deviation point, the period S of the periodic operation-speed change stored by the register 87, and the current operation amount C of the feeding device 54, 50 detected by the position detecting portion 92, the phase D of the maximum-deviation point counted from the reference operation position of the feeding device 54, 50 as the current operation amount thereof detected by the detecting portion 92, and stores the determined phase D of the maximum-deviation point in the register 86.

The period B of the periodic rotation-speed change and the phase D of the maximal-deviation point of the periodic rotation-speed change, stored by the registers 87, 86, may be related to the current rotation amount of the feeding roller 50, when the MFD 1 is shipped from a factory. However, in particular, the maximal-deviation-point phase D needs to be defined by a rotation amount of the feeding roller 50 from a reference phase with respect to the period B. Therefore, if the rotation-amount detector 92 cannot accurately detect the rotation amount of the feeding roller 50 because the rotation amount detected by the detector 92 is lost when the supplying of electric power to the MFD 1 is stopped or because the feeding roller 50 is forcedly rotated by a hand of a user, the phase comparing portion cannot accurately compare the phase of the periodic speed change that corresponds to the control-end position, and the phase of the maximal-deviation point of the periodic speed change, with each other.

When the MFD 1 is started, the periodic-change-phase detector 120 operates the LF motor 54 to rotate the feeding roller 50, obtains the rotation amount of the feeding roller 50 when the periodic speed change takes the maximal deviation from the reference speed such as an average speed, determines, based on the obtained rotation amount of the feeding roller 50, the phase D of the maximal-deviation point from the reference position of the feeding roller 50, and stores the determined phase D of the maximal-deviation point in the register 86 as the periodic-change-characteristic memory. Therefore, the phase comparing portion (S500) can accurately compare the phase of the periodic speed change that corresponds to the control-end position, and the phase of the maximal-deviation point of the periodic speed change, with each other.

In the second embodiment, the MFD includes a phase-difference calculating portion (S440) which calculates, upon inputting to the sheet-feeding control device 70 of the feeding command to feed the recording sheet P to the target stop position in each of continuous feeding operations, a phase difference Cdd of (a) the phase D of the maximum-deviation point and (b) a phase Dc of a control-end point of the periodic speed change that corresponds to the control-end position Cc distant from the target stop position Cf by the predetermined amount α, based on the period B of the periodic speed change stored by the register 87 and the current operation amount of the LF motor 54 or the feeding roller 50 detected by the position detecting portion 92 as the operation-amount detector; and a control-end-position correcting portion (S450, S460) which corrects, based on the calculated phase difference Cdd, the control-end position Cc such that the smaller the phase difference Cdd is, the greater an amount F of correction of the control-end position Cc is.

Figure 20A:
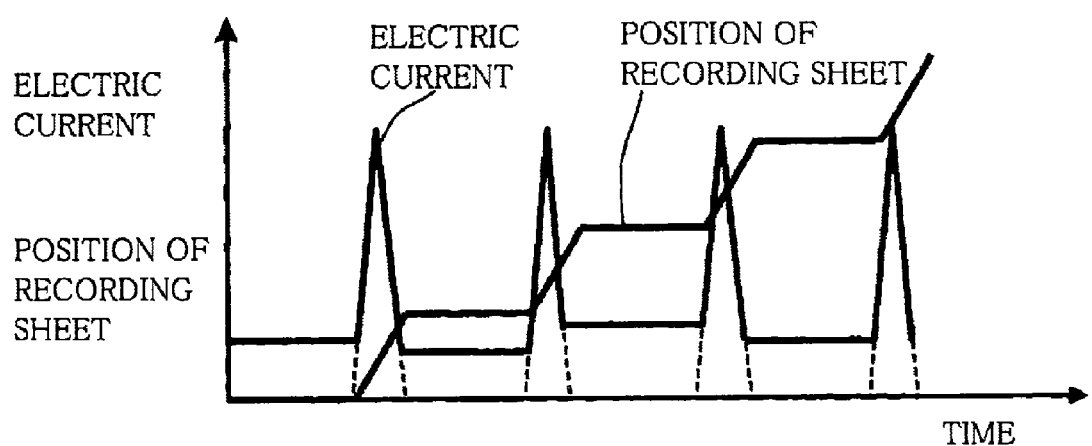
FIG. 20A is a graph for explaining respective time-wise changes of (a) a position of a recording sheet and (b) a feeding electric current and a holding electric current that are alternately supplied to an electric motor of the MFD of FIG. 15.
Figure 20B:
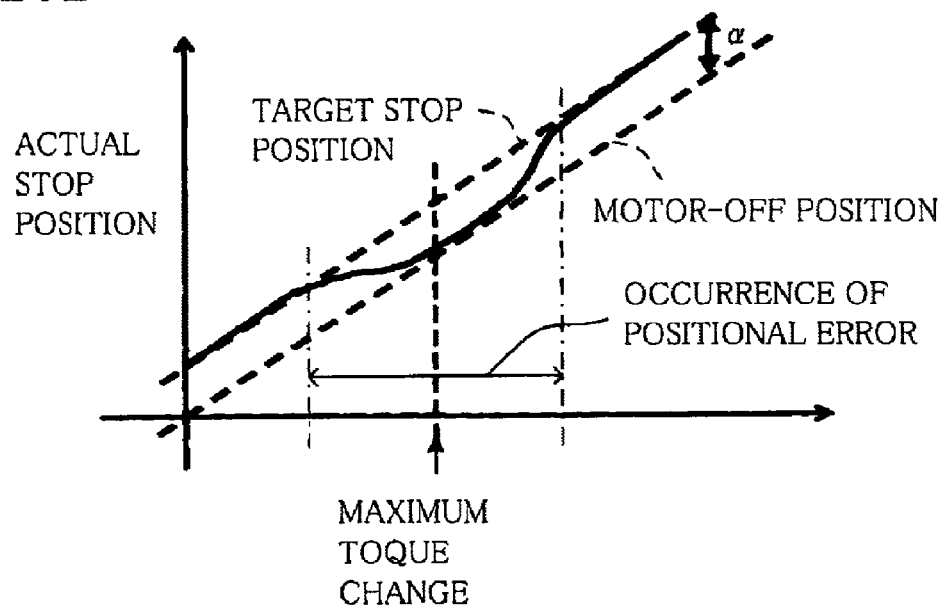
FIG. 20B is a graph for explaining an actual stop position of a sheet feeding roller that may be deviated from a target stop position because of a periodic torque change occurring to the electric motor.

If only the holding electric current I as the second power is supplied to the LF motor 54, the recording sheet P may not be accurately stopped at the target stop position Cf, as shown in FIG. 20B, because of the influences of the periodic speed change occurring to the feeding device including the feeding roller 50.

However, the MFD as the second embodiment can accurately stop the feeding roller (or the object) at the target stop position. More specifically described, the phase difference Cdd calculated at Step S440 indicates a deviation of the control-end position (i.e., the motor-off position) where the supplying of the feeding electric current to the LF motor 54 ends, from the maximal-deviation point having the maximum deviation from the reference speed. The smaller this deviation Cdd is, the greater internal force is exerted to the feeding roller 50 because of the periodic speed change of the feeding device. Therefore, the MFD corrects the control-end position so as to rotate additionally the feeding roller 50 against the above-indicated internal force. Thus, the MFD can accurately rotate (or feed) the feeding roller 50 (or the recording sheet P) to the target stop position.

It is to be understood that the present invention may be embodied with various changes, modifications, and improvements that may occur to a person skilled in the art without departing from the spirit and scope of the invention defined in the appended claims.

What is claimed is:

1. A feeding apparatus, comprising:
   a feeding device including (a) a feeding roller which rotates to feed, in each of a plurality of feeding operations, an object in a feeding direction in a state in which an external force is exerted to the object from an element other than the feeding device in a direction parallel to the feeding direction, and (b) a motor which rotates the feeding roller and thereby feeds the object in the feeding direction; and
   a controller which controls, in said each feeding operation, the motor by supplying, in a first control mode, a first power to the motor so as to feed the object to a control-end position distant from a target stop position by a predetermined amount, and subsequently supplying, in a second control mode, a second power different from the first power, to the motor such that due to the second power supplied to the motor, the feeding roller applies, to the object, a resisting force resisting the external force and thereby stops the object at an actual stop position against the external force so as to prevent at least a portion of a movement of the object in said direction parallel to the feeding direction that is caused by the external force, wherein after the object is stopped at the actual stop position in the second control mode of said each feeding operation, the controller continues supplying the second power to the motor such that the feeding roller holds the object at the actual stop position against the external force.

2. The feeding apparatus according to claim 1, further comprising
   an operation-amount detector which detects a current operation amount of the feeding device counted from a reference operation position thereof and thereby detects a current position of the object in the feeding direction; and a periodic-change-characteristic memory which stores (a) a period, B, of a periodic operation-speed change which occurs to an operation speed of the feeding device when the feeding device feeds the object and which has a maximum-deviation point having a maximum deviation from a reference operation speed, and (b) a phase of the maximum-deviation point,
   wherein the controller includes at least one of (a) a first second-power supplying portion which supplies, when a phase of a control-end point of the periodic operation-speed change that corresponds to the control-end position distant from the target stop position by the predetermined amount and that is determined based on the period of the periodic operation-speed change stored by the periodic-change-characteristic memory and the current operation amount of the feeding device detected by the operation-amount detector, falls in at least a portion of a range of from the phase of the maximum-deviation point minus half said period, $-B/2$, to the phase of the maximum-deviation point, the second power to the motor, such that the feeding roller applies, to the object, the resisting force resisting the external force as a first external force which is exerted to the object in a first direction parallel to, and opposite to, the feeding direction, and (b) a second second-power supplying portion which supplies, when the phase of the control-end point falls in at least a portion of a range of from the phase of the maximum-deviation point to the phase of the maximum-deviation point plus half said period, $+B/2$, the second power to the motor, such that the feeding roller applies, to the object, the resisting force resisting the external force as a second external force which is exerted to the object in a second direction same as the feeding direction.

3. The feeding apparatus according to claim 2, wherein the controller further includes a phase comparing portion which determines, upon inputting to the controller of a feeding command to feed the object to the target stop position, the phase of the control-end point of the periodic operation-speed change that corresponds to the control-end position, based on the period of the periodic operation-speed change stored by the periodic-change-characteristic memory and the current operation amount of the feeding device detected by the operation-amount detector, and which compares the determined phase of the control-end point and the phase of the maximum-deviation point with each other.

4. The feeding apparatus according to claim 3, wherein the controller further includes a control-end-position correcting portion which corrects, based on a difference of the phase of the control-end point and the phase of the maximum-deviation point, the control-end position to a corrected control-end position, and wherein the phase comparing portion determines a phase of a corrected control-end point of the periodic operation-speed change that corresponds to the corrected control-end position, and compares the thus determined phase of the corrected control-end point and the phase of the maximum-deviation point with each other.

5. The feeding apparatus according to claim 4, wherein the controller further includes a correction-amount calculating portion which calculates, based on the difference of the phase of the control-end point and the phase of the maximum-deviation point, a correction amount to correct the control-end position, and wherein the control-end-position correcting portion corrects, based on the correction amount calculated by the correction-amount calculating portion, the control-end position to the corrected control-end position.

6. The feeding apparatus according to claim 2, wherein said at least one of the first second-power supplying portion and the second second-power supplying portion supplies the second power to the motor, such that the smaller a difference of the phase of the control-end point and the phase of the maximum-deviation point is, the greater the second power is.

7. The feeding apparatus according to claim 2, wherein the controller includes the first second-power supplying portion and the second second-power supplying portion, and further includes a switching portion which recognizes, based on the current position of the object detected by the operation amount detector, which one of the first and second external forces is exerted to the object, and which operates, based on the recognized one of the first and second external forces, a corresponding one of the first second-power supplying portion and the second second-power supplying portion to supply the second power to the motor.

8. The feeding apparatus according to claim 7, wherein the controller further includes a control-end-position determining portion which determines, when the switching portion recognizes that the first external force is exerted to the object, the control-end position such that the control-end position is distant from the target stop position by the predetermined amount including an amount corresponding to at least a portion of a movement of the object in the first direction that is caused by the first external force, and determines, when the switching portion recognizes that the second external force is exerted to the object, the control-end position such that the control-end position is distant from the target stop position by the predetermined amount including an amount corresponding to at least a portion of a movement of the object in the second direction that is caused by the second external force.

9. The feeding apparatus according to claim 2, further comprising a periodic-change-phase detector which drives, when the feeding apparatus is started, the motor to operate the feeding roller, and determines, based on a plurality of said operation amounts periodically detected by the operation-amount detector, the maximum-deviation point of the periodic operation-speed change of the feeding device, wherein the periodic-change-phase detector determines, based on the determined maximum-deviation point, the period of the periodic operation-speed change stored by the periodic-change-characteristic memory, and the current operation amount of the feeding device detected by the operation-amount detector, the phase of the maximum-deviation point counted from the reference operation position of the feeding device as the current operation amount thereof detected by the operation-amount detector, and stores the determined phase of the maximum-deviation point in the periodic-change-characteristic memory.

10. The feeding apparatus according to claim 2, wherein the controller further includes a second-control-mode cancelling portion which controls, when a difference of the phase of the control-end point and the phase of the maximum-deviation point is greater than a reference value, said at least one of the first second-power supplying portion and the second second-power supplying portion not to supply the second power to the motor, such that the feeding roller does not apply the resisting force to the object and allows the object to be moved, by the external force and an inertia of the feeding device, from the control-end position to the target stop position by the predetermined amount.

11. An image forming system, comprising: the feeding apparatus according to claim 2, wherein the feeding apparatus feeds a recording medium as the object, to an image-forming position as the target stop position; and an image forming device which forms an image on the recording medium fed to the image-forming position by the feeding apparatus.

12. The feeding apparatus according to claim 1, further comprising an operation-amount detector which detects a current operation amount of the feeding device counted from a reference operation position thereof and thereby detects a current position of the object in the feeding direction, wherein the controller detects, based on the current position of the object detected by the operation-amount detector, that the object is stopped at the actual stop position.

13. A feeding apparatus comprising:
a feeding device including (a) a feeder which feeds, in each of a plurality of feeding operations corresponding to a plurality of target stop positions, respectively, an object in a feeding direction, and (b) a motor which operates the feeder and thereby feeds the object;
an operation-amount detector which detects a current operation amount of the feeding device counted from a reference operation position thereof and thereby detects a current position of the object in the feeding direction; and
a controller which controls, in said each of the feeding operations, the motor by supplying, in a first control mode, a first power to the motor so as to feed the object to a control-end position distant by a predetermined amount from a corresponding one of the target stop positions, and subsequently supplying, in a second control mode, a second power different from the first power, to the motor,
wherein the controller includes
a second-power supplying portion which supplies, in the second control mode after the first control mode ends in a current one of the feeding operations and before the first control mode starts in a following one of the feeding operations, the second power to the motor such that the feeder stops and holds the object at a first actual stop position, and
a second-power updating portion which obtains, when the second-power supplying portion is supplying the second power to the motor to hold the object at the first actual stop position, the first actual stop position of the object detected by the operation-amount detector, and updates, based on a difference of the obtained first actual stop position and a first one of the target stop positions that corresponds to the current feeding operation, the second power to an updated second power such that in the second control mode of the following feeding operation after the first power is supplied to the motor in the first control mode of the following feeding operation, the updated second power is supplied to the motor and the feeder stops and holds the object at a second actual stop position, such that a difference of the second actual stop position and a second one of the target stop positions that corresponds to the following feeding operation is smaller than the difference of the first actual stop position and the first target stop position corresponding to the current feeding operation.

14. The feeding apparatus according to claim 13, further comprising, a periodic-change-characteristic memory which stores (a) a period, B, of a periodic operation-speed change which occurs to an operation speed of the feeding device when the feeding device feeds the object and which has a maximum-deviation point having a maximum deviation from a reference operation speed, and (b) a phase of the maximum-deviation point, wherein the controller further includes a phase-difference calculating portion which calculates, upon inputting to the controller of a feeding command to feed the object to the target stop position in said each feeding operation, a phase difference of (a) the phase of the maximum-deviation point and (b) a phase of a control-end point of the periodic operation-speed change that corresponds to the control-end position distant from the target stop position by the predetermined amount, based on the period of the periodic operation-speed change stored by the periodic-change-characteristic memory and the current operation amount of the feeding device detected by the operation-amount detector; and a control-end-position correcting portion which corrects, based on the calculated phase difference, the control-end position such that the smaller the phase difference is, the greater an amount of correction of the control-end position is.

15. The feeding apparatus according to claim 14, further comprising a periodic-change-phase detector which drives, when the feeding apparatus is started, the motor to operate the feeder, and determines, based on a plurality of said operation amounts periodically detected by the operation-amount detector, the maximum-deviation point of the periodic operation-speed change of the feeding device, wherein the periodic-change-phase detector determines, based on the determined maximum-deviation point, the period of the periodic operation-speed change stored by the periodic-change-characteristic memory, and the current operation amount of the feeding device detected by the operation-amount detector, the phase of the maximum-deviation point counted from the reference operation position of the feeding device as the current operation amount thereof detected by the operation-amount detector, and stores the determined phase of the maximum-deviation point in the periodic-change-characteristic memory.

16. The feeding apparatus according to claim 14, wherein the controller further includes a target-stop-position correcting portion which corrects, based on the phase difference calculated by the phase-difference calculating portion in said each feeding operation, the corresponding target stop position to a corrected corresponding target stop position, and wherein the second-power updating portion obtains, when the second-power supplying portion is supplying the second power to the motor, the first actual stop position of the object detected by the operation-amount detector, and updates, based on a difference of the obtained first actual stop position and the corrected first target stop position corresponding to the current feeding operation, the second power to the updated second power such that in the second control mode of the following feeding operation, the updated second power is supplied to the motor and the feeder applies the updated resisting force resisting the external force and thereby stops and holds the object at the second actual stop position, such that the difference of the second actual stop position and the corrected second target stop position corresponding to the following feeding operation is smaller than the difference of the first actual stop position and the corrected first target stop position corresponding to the current feeding operation.

17. The feeding apparatus according to claim 16, wherein the second-power updating portion updates, based on the difference of the obtained first actual stop position, Cs, and the corrected target stop position, Ct, corresponding to the current feeding operation, an electric current, $I_C$, as the second power to an updated electric current, $I_F$, as the updated second power, according to a following expression:

$$I_F = I_C - k(Cs - Ct)$$

where k is a pre-set constant.

18. An image forming system, comprising: the feeding apparatus according to claim 13, wherein the feeding apparatus feeds a recording medium as the object, to an image-forming position as the target stop position; and an image forming device which forms an image on the recording medium fed to the image-forming position by the feeding apparatus.

19. A method of controlling a feeding device including (a) a feeding roller which is rotated to feed, in each of a plurality of feeding operations, an object in a feeding direction in a state in which an external force is exerted to the object from an element other than the feeding device in a direction parallel to the feeding direction, and (b) a motor which rotates he feeding roller and thereby feeds the object in the feeding direction, the method comprising the steps of:

first supplying, in a first control mode in said each feeding operation, a first power to the motor so as to feed the object to a control-end position distant from a target stop position by a predetermined amount, and second supplying, in a second control mode after the first control mode in said each feeding operation, a second power different from the first power, to the motor such that due to the second power supplied to the motor, the feeding roller applies, to the object, a resisting force resisting the external force and thereby stops the object at an actual stop position against the external force so as to prevent at least a portion of a movement of the object in said direction parallel to the feeding direction that is caused by the external force, wherein said step of second supplying comprises the steps of, after the object is stopped at the actual stop position in the second control mode of said each feeding operation, continuously supplying the second power to the motor such that the feeding roller holds the object at the actual stop position against the external force.

20. The method according to claim 19, wherein said step of second supplying comprises at least one of steps of (a) supplying the second power to the motor such that the feeding roller applies, to the object, the resisting force resisting the external force as a first external force which is exerted to the object in a first direction parallel to, and opposite to, the feeding direction, and (b) supplying the second power to the motor such that the feeding roller applies, to the object, the resisting force resisting the external force as a second external force which is exerted to the object in a second direction same as the feeding direction.

21. The method according to claim 20, further comprising detecting a current operation amount of the feeding device counted from a reference operation position thereof, and thereby detecting a current position of the object in the feeding direction, and obtaining a period, B, of a periodic operation-speed change which occurs to an operation speed of the feeding device when the feeding device feeds the object and which has a maximum-deviation point having a maximum deviation from a reference operation speed, and additionally obtaining a phase of the maximum-deviation point, wherein said second supplying comprises at least one of (a) supplying, when a phase of a control-end point of the periodic operation-speed change that corresponds to the control-end position distant from the target stop position by the predetermined amount and that is determined based on the obtained period of the periodic operation-speed change and the detected current operation amount of the feeding device, falls in at least a portion of a range of from the phase of the maximum-deviation point minus half said period, −B/2, to the phase of the maximum-deviation point, the second power to the motor, such that the feeding roller applies, to the object, the resisting force resisting the first external force, and (b) supplying, when the phase of the control-end point falls in at least a portion of a range of from the phase of the maximum-deviation point to the phase of the maximum-deviation point plus half said period, +B/2, the second power to the motor, such that the feeding roller applies, to the object, the resisting force resisting the second external force.

22. A method of forming an image on a recording medium, comprising: feeding, by controlling a feeding device in the method according to claim 19, a recording medium as the object, to an image-forming position as the target stop position, and forming an image on the recording medium fed to the image-forming position.

23. A method of controlling a feeding device including (a) a feeder which feeds, in each of a plurality of feeding operations corresponding to a plurality of target stop positions, respectively, an object in a feeding direction, and (b) a motor which operates the feeder and thereby feeds the object, the method comprising the steps of:

supplying, in a first control mode in said each of the feeding operations, a first power to the motor so as to feed the object to a control-end position distant by a predetermined amount from a corresponding one of the target stop positions, and supplying, in a second control mode after the first control mode in said each feeding operation, a second power different from the first power, to the motor, wherein said supplying the second power comprises supplying, in the second control mode after the first control mode ends in a current one of the feeding operations and before the first control mode starts in a following one of the feeding operations, the second power to the motor such that the feeder stops and holds the object at a first actual stop position, and wherein the method further comprises obtaining, when the second power is being supplied to the motor in the second control mode of the current feeding operation to hold the object at the first actual stop position, the first actual stop position of the object, and updating, based on a difference of the obtained first actual stop position and a first one of the target stop positions that corresponds to the current feeding operation, the second power to an updated second power such that in the second control mode of the following feeding operation after the first power is supplied to the motor in the first control mode of the following feeding operation, the updated second power is supplied to the motor and the feeder stops and holds the object at a second actual stop position, such that a difference of the second actual stop position and a second one of the target stop positions that corresponds to the following feeding operation is smaller than the difference of the first actual stop position and the first target stop position corresponding to the current feeding operation.

* * * * *